United States Patent [19]
Liu et al.

[11] Patent Number: 5,339,815
[45] Date of Patent: Aug. 23, 1994

[54] METHODS AND APPARATUS FOR ANALYZING AN ULTRASONIC IMAGE OF AN ANIMAL OR CARCASS

[75] Inventors: Yujun Liu; James R. Stouffer, both of Ithaca, N.Y.

[73] Assignee: Cornell Research Foundation, Inc., Ithaca, N.Y.

[21] Appl. No.: 995,189

[22] Filed: Dec. 22, 1992

[51] Int. Cl.$^5$ .............................................. A61B 8/00
[52] U.S. Cl. ......................... 128/660.01; 128/660.07; 364/413.25
[58] Field of Search ...................... 128/660.01, 660.04, 128/660.07; 73/602; 364/413.25

[56] References Cited
U.S. PATENT DOCUMENTS

| | | | |
|---|---|---|---|
| 4,785,817 | 11/1988 | Stouffer | 128/660.07 |
| 4,939,574 | 7/1990 | Petersen et al. | 358/93 |
| 5,079,951 | 1/1992 | Raymond et al. | 73/602 |
| 5,140,988 | 8/1992 | Stouffer et al. | 128/660.01 |
| 5,208,747 | 5/1993 | Wilson et al. | 364/413.25 |

Primary Examiner—Francis Jaworski
Attorney, Agent, or Firm—Christopher A. Michaels; Michael F. Brown; Ralph R. Barnard

[57] ABSTRACT

The present teaches new method and apparatus for evaluating ultrasonic images of muscle of an animal or carcass. Method and apparatus are taught for recognizing muscle interfaces of an animal or carcass from an ultrasonic image of a muscle area. Method and apparatus are taught for determining marbling scores of a muscle of an animal or carcass from an ultrasonic image of the muscle. Method and apparatus are taught for detecting an outline of a muscle from an ultrasonic image of an animal or carcass.

17 Claims, 7 Drawing Sheets

```
111111111111111111111111
111111111111111111111111
111122222222222222221111
111122222222222222221111
111122222222222222221111
111122222222222222221111
111122222222222222221111
111111111111111111111111
111111111111111111111111
```

*FIG. 5a*
THE ORIGINAL IMAGE

```
111111111111111111111111
111222222222222222211111
111222222222222222211111
111222222222222222211111
111222222222222222211111
111222222222222222211111
111111111111111111111111
111111111111111111111111
111111111111111111111111
```

*FIG. 5b*
THE SHIFTED IMAGE
(LEFT 1 & UP 1 PIXEL)

|  1 |  1 |  1 |  0 |  0 |
|----|----|----|----|----|
|  1 |  1 |  1 |  0 |  0 |
|  1 |  1 |  0 | -1 | -1 |
|  0 |  0 | -1 | -1 | -1 |
|  0 |  0 | -1 | -1 | -1 |
*FIG. 6a*
KERNEL A:
FOR NEGATIVE SLOPE
DIVISOR = 8
| -1 | -1 | -1 |  0 |  0 |
|----|----|----|----|----|
| -1 | -1 | -1 |  0 |  0 |
| -1 | -1 |  0 |  1 |  1 |
|  0 |  0 |  1 |  1 |  1 |
|  0 |  0 |  1 |  1 |  1 |
*FIG. 6b*
KERNEL B:
FOR POSITIVE SLOPE
DIVISOR = 8
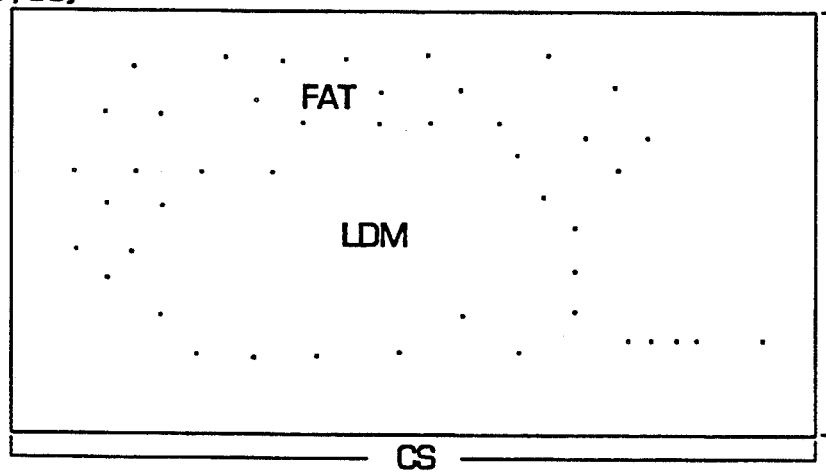
*FIG. 7*
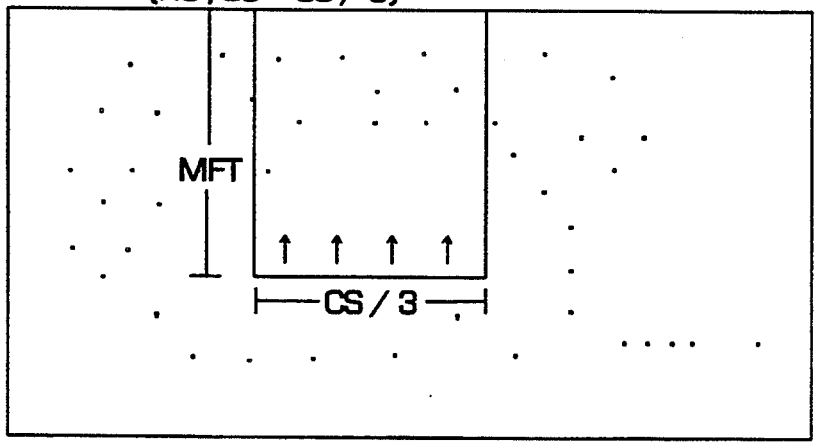
*FIG. 8*

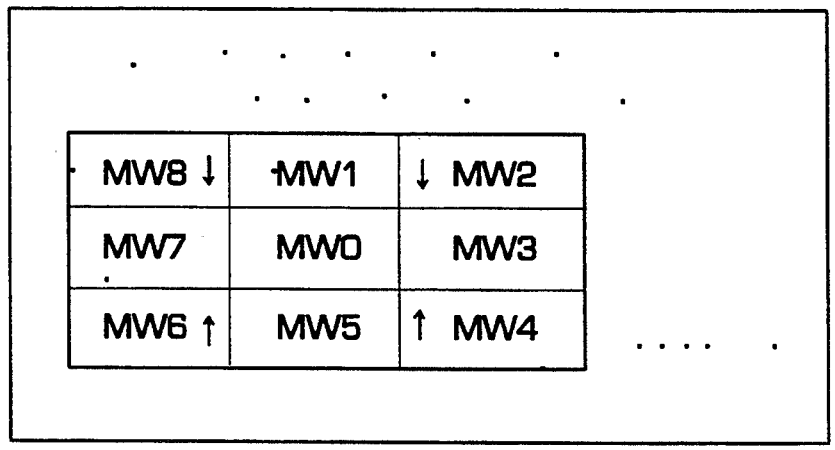
FIG. 12
FIG. 13
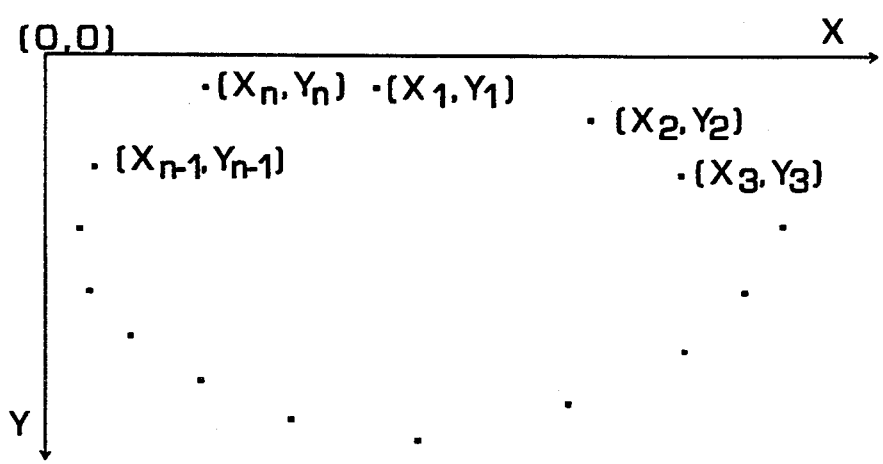

METHODS AND APPARATUS FOR ANALYZING AN ULTRASONIC IMAGE OF AN ANIMAL OR CARCASS

CROSS-REFERENCE TO RELATED APPLICATION

This patent application is related to subject matter disclosed in copending patent application Ser. No. 07/918,979, filed Jul. 24, 1992, entitled "Method and Apparatus for Positioning an Ultrasonic Transducer for Longitudinal Scanning of an Animal or Carcass" in that both applications discuss the use of ultrasound equipment for the evaluation of animals and carcasses.

FIELD OF THE INVENTION

The present invention relates to ultrasonic animal and carcass evaluation, and more particularly relates to methods and apparatus for analyzing an ultrasonic image of an animal or carcass.

BACKGROUND OF THE INVENTION

Evaluating and grading meat animals, both live and slaughtered, has historically been performed by humans. Because of this it is very difficult to achieve accuracy, efficiency and consistency. Both producers and packers demand an objective means of classifying their animals accurately according to their carcass real values. However, since an accurate, quick, and consistent grading system has not been put into place, producers are not being paid for the true value of their animals. Currently, producers are paid on an average basis. The price differential between a high-yield and a low-yield grade is less than it should be. Therefore, it is important to the hog and beef industries that improved or new technologies must be developed in their evaluation systems in order to be able to accurately measure the hog and beef carcass characteristics that are of significant value.

The ultrasonic equipment currently used in practice is either A-mode (A for amplitude) or B-mode (B for brightness). The A-mode scanner does not produce a two-dimensional image but the B-mode does. Hence, most ultrasonic scanners in medical and animal fields are B-mode. In practical application, the images produced by the B-scanner, in the animal field for quality (e.g. marbling) and quantity (e.g. fat depth and muscle area) evaluation are currently assessed by human eyes. There is no objective tool or computer software or hardware currently available to automate the evaluation process.

Currently, ultrasonic images are interpreted and evaluated by humans. Only highly trained interpreters can analyze these images to determine the fat thickness and muscle area. This is not only a time consuming and laborious process but also a subjective method from which accuracy, repeatability, and efficiency can hardly be achieved. In previous studies attempts were made to develop computer algorithms for ultrasound image analysis to estimate important carcass traits in both live animals and carcasses.

Typically, ultrasonic images of the Longissimus dorsi (rib eye muscle in beef and loin eye muscle in hogs) have been used to evaluate livestock. This has been done by positioning the transducer in either a perpendicular or parallel direction with respect to the backbone of the livestock. EPO Patent application publication number 0 337 661 A1, entitled, "Method and apparatus for grading of live animals and animal carcasses" teaches method and apparatus for longitudinal (parallel to the backbone) scanning and image recognition to determine automatically fat and muscle characteristics. Wilson was not the first to use longitudinal scanning to evaluate carcasses, as shown by the Phd thesis by Wayne A. Gillis entitled "An Evaluation of Indices of Carcass Yield, Physical Composition and Chemical Composition in Swine; and Ultrasonic Measurement of the Longissimus Dorsi Area and Fat Thickness in Beef and Swine", which shows longitudinal scanning Another group currently using longitudinal scanning is CSB-SYSTEM of America Corporation.

Neither Wilson, Gillis or CSB teach some of the problems associated with performing longitudinal scans or method or apparatus for consistently locating the transducer on the animal or carcass. One problem with longitudinal scanning occurs when the transducer is parallel to the back fat layers. Artifacts or multiples of the fat layers and the muscle/fat interface show up down in the image of the muscle layer. These multiples occur as a result of the sound waves rebounding directly back off of these layers and interfere with image recognition apparatus methods for determining muscle and fat composition. As can be seen by the advertising literature, the CSB system has the problem of artifacts as shown in the ultrasound image displayed on the first page.

Wilson teaches means for image recognition and automatic calculation of muscle and fat composition by charting the brightness of columns in a rotated ultrasound image. The middle of bands of bright column regions is assumed to be an interface. The wide bands result in obvious inaccuracies because the interface is not directly determined. The fat layers are not parallel to the bottom of the longissimus dorsi muscle. When Wilson looks at columns parallel to the fat layers, he will obtain artifacts and a large bright region for the bottom of the Longissimus dorsi because that interface will not be parallel to the columns.

Labor costs and inconsistent grading are significant problems in the meat processing industry. Other attempts have been made to automate the grading and inspection systems involved in meat processing. For example see U.S. Pat. No. 4,931,933, entitled, "Application of Knowledge-Based System for Grading Meat" granted to Chen et al, and U.S. Pat. No. 5,079,951, entitled "Ultrasonic Carcass Inspection" granted to Raymond et al. However, these systems are overly complicated and do not provide an efficient method of accurately measuring the Longissimus dorsi muscle depth and fat composition.

Berlow et al. [1989] developed computer software at Cornell University to measure fat depth, rib eye area, and marbling from ultrasonic images of beef using threshold brightness levels. The results were encouraging: fat depth estimates were quite satisfactory compared with physical carcass measurements ($r=0.92$) while the correlations between computer measured rib eye area and marbling and their corresponding carcass measurements were not as high as expected ($r=0.47$ for area and $r=0.36$ for marbling). The author found that considerable variation in correlations existed among different breed populations. Overall image brightness levels vary with each image and can be adjusted by the operator for best viewing. So an arbitrary threshold level is not at all practical for a variety of operators and varying populations of subjects.

Very few studies on computer processing of ultrasonic images from animals have been available. The results seen in the literature were not as satisfactory or consistent as might have been expected. Incorporating machines into the evaluating process has been studied. However, there has been no accurate and efficient system developed yet for practical use.

The intramuscular fat or marbling is the most important Quality Grade factor associated with beef in the U.S. and some other countries. Unfortunately, it is difficult (if not impossible) to visually assess marbling in a live animal and it is subjective to do so in an animal carcass. Producers desire a tool for classifying beef animals for marbling in feedlots and packers demand a means of sorting beef hot carcasses for marbling in abattoirs. Several previous studies [Lake, 1991; Aneshansley et al., 1990; Brethour, 1990; Berlow et al., 1989; Thane et al., 1989] indicate that ultrasound has the potential to meet both requirements. Currently, the interest in utilizing ultrasonic equipment is increasing [Lake, 1991; Stouffer 1991].

In particular for marbling evaluation, the characteristics of the ultrasound speckle and its image texture are not yet completely understood. The results of relating some parameters obtained from the image to its corresponding carcass marbling score are inconsistent.

Berlow et al [1989] attempted to use image threshold technique to estimate marbling scores but the correlations achieved were very low (r=0.34 to 0.37). Thane et al [1989] associated the analyzed image parameters such as the Fourier distance, fractal dimension and slope of attenuation, with marbling score and the results showed correlation coefficients from 0.03 to 0.36. On the other hand, Brethour [1990] demonstrated a visual scoring system based on the observed level of speckle over the longissimus dorsi (l.d.) muscle, the echogenicity of the rib bone, and speckle pattern below the rib bone as an estimate of marbling. This system classified beef carcasses as Select or Choice grades with 77% accuracy. Several earlier investigators [Wagner et al., 1983; Flax et al., 1981; Burckhardt, 1978] of ultrasound B-scanning have used stochastic signal analysis to describe the character of ultrasound speckle as coherent noise and demonstrated that the speckle noise is autocorrelated. Very little work, however, has been devoted to connect the autocorrelation property of ultrasonic speckle with beef marbling score.

The speckle noise of ultrasound is a complicated function of the roughness of surface which reflects or scatters ultrasonic waves and such noise is autocorrelated. It can be argued that the animal tissue can be treated as a collection of scatterers. It is believed that the tissue of longissimus muscle with many small particles of intramuscular fat or marbling will be rougher and thereby have more scatterers than those without marbling. It is, therefore, reasonable to speculate that there exists a certain relationship between the speckle autocorrelation and marbling.

Longissimus dorsi or ribeye muscle cross-sectional area is currently obtained by manually tracing around the perceived outline of the muscle from an ultrasonic image. Some ultrasonic scanners, like the latest model we have been using [Aloka, 1990a], provide the capability of approximating the area with an ellipse. Due to its low degree of accuracy and the relatively large time requirement, this feature is seldom used. It is, however, more common for the images to be recorded on a video tape and the area analysis done at a later time. This analysis is still a very time consuming process. Because of the quality of the image, accurately tracing the l.d. muscle area can be done only by trained technicians. It is, therefore, very difficult to achieve efficiency, consistency and accuracy.

In previous studies attempts were made to develop computer software to automate the ribeye area tracing process. Namely, Betlow et al. [1989a] developed a three-target-point algorithm for ultrasonic images from beef and showed that the correlations between the computer and manual l.d. muscle area measurements were in the range from 0.055 to 0.47, depending upon the image quality and the cattle breeds. McDonald and Chen [1989] presented a modified version of the Meyer algorithm [1979] to isolate the l.d. region from a photographic image of the exposed surface of a beef carcass rib. The method achieved adequate performance under certain circumstances, but it is not suitable for ultrasonic images. Lake [1991] reported results of research conducted in Australia about computer aided tracing of the l.d. muscle, but the tracing process per se is done manually with a pointing device.

The present invention includes the discovery of the problems described herein and their solutions.

SUMMARY OF THE INVENTION

It is a primary objective of this invention to provide methods for evaluating an ultrasonic image of a muscle region of an animal or carcass.

It is a further objective of this invention to provide methods for evaluating an ultrasonic image of a muscle region of an animal or carcass and automatically determining the depth of the muscle and of the fat between the muscle and skin.

It is a further objective of this invention to provide methods for evaluating an ultrasonic image of a muscle region of an animal or carcass and automatically determining the marbling (fat content) of the muscle.

It is a further objective of this invention to provide methods for evaluating an ultrasonic image of a muscle region of an animal or carcass and automatically determining the outline of muscle within the image.

A new and simple, one dimensional sliding Z-test algorithm for edge and peak detection has been developed under the null hypothesis that the sample differences for any two adjacent neighborhoods come from the same normal distribution. Edges are identified by noting the places where the statistic Z-value reaches a specified threshold. The algorithm is very efficient in computation since the variance of the area of interest in an image is computed only once, compared to other sliding statistical tests used for edge detection [Souza, 1983] where the variance has to be calculated for each sliding window, and the Z-test can be performed in a constant number per image, independent of the size of the sliding window, and it can be even more efficient when the correlation between two groups of pixels of a fixed distance is invariant for a particular set of images.

The present invention teaches a method of automatically recognizing fat and muscle interfaces of an animal or carcass from an ultrasonic image of a muscle and fat area. An input is provided of an ultrasonic scan image of the muscle and fat area of the animal or carcass comprising rows and columns of pixel data. A window of rows and columns of pixels within the image input is selected. Scanning upward through the window, starting at a point in the bottom row of pixels within the window, an interface is determined. A sliding lower box of pixels and an adjacent sliding upper box of pixels are defined wherein the sliding boxes are redefined to move up through the window one row at a time at least until the interface is determined. The expected value and the standard deviation of the difference between the means of the gray levels of the pixels within the sliding lower box and the sliding upper box are calculated. A number of normal deviates value is calculated for each row of pixels moving upwards through the window, wherein the number of normal deviates value is computed from the values determined previously by dividing the absolute value of the difference of the means of the gray levels of the pixels within the sliding lower box and the upper box less the computed expected value, by the computed standard deviation. The interface is defined at a specified row of pixels when the number of normal deviates value for the specified row of pixels is greater than both a predefined interface threshold and is greater than the number of normal deviates value calculated for the row of pixels one row lower and one row higher than the specified row of pixels. Then an output of the determined interface is provided. A second interface can be determined by scanning upward through the window beginning at a point above the determined first interface. The method can assume that the expected value of the difference between the means of the gray levels of the pixels within the sliding lower box and the sliding upper box equal 0 and that the standard deviation of the means of the gray levels of the pixels within the sliding lower box and the sliding upper box are equal.

The method has been used to locate interfaces when wherein an ultrasonic transducer was centered in a longitudinal direction over the last few ribs of the animal or carcass and the ultrasonic image is of a ribline, a longissimus dorsi muscle and fat layers above the muscle such that the specified window starts below the ribline of the animal or carcass. A fat depth was determined from a distance between the second interface line and a specified plane of contact between the animal or carcass and the ultrasonic transducer adjusted for any positioning equipment or stand-off gel. A muscle depth was determined from a distance between the first and second interfaces line. The output of the system included the fat depth and the muscle depth for the animal or carcass from which the image was taken. The method can be also be used when the ultrasonic scan image input is transverse with respect to a backbone of the animal or carcass.

Speckle noise in ultrasound B-mode images of the longissimus dorsi or ribeye muscle acquired from live beef is statistically modeled and related to beef carcass intramuscular fat or marbling score. Marbling scores are visually-determined on their corresponding carcass rib cross-sections by experienced meat scientists and then converted to percentage of the fat area covering the ribeye area. Based on the assumption that within the ribeye muscle the ultrasonic image intensity and the white noise are Gaussian distributed, autoregression and autocorrelation procedures are applied to a specified area considered representing the speckle noise inside the ribeye of the ultrasonic image. The variance of white noise is estimated by the autocorrelation coefficients and the variance within the specified area. By superimposing the two Gaussian distribution curves after standardization, the non-overlapped area under them is assumed to be caused by the roughness of surfaces scattering the ultrasonic wave or the intramuscular fat particles. This area is used for determining correlations with the fat area percentage to predict marbling.

The present invention includes a method of determining marbling scores of a muscle of an animal or carcass from an ultrasonic image of the muscle. An input is provided of an ultrasonic scan image of the muscle and fat area of the animal or carcass comprising rows and columns of pixel data. A window of rows and columns of pixels within the image input is selected. Correlations between gray values of neighboring pixels within the window are calculated. A marbling score regression equation is provided which includes the marbling score as a dependant variable and the correlations between neighboring pixels as an independent variable. The marbling score regression equation is solved and an output is provided of the marbling score corresponding to the image input.

The method can further include calculating a variance of gray values of pixels within the window and calculating a adjusted variance of gray values of pixels within the window adjusted for the correlations between gray values of neighboring pixels. The normal distribution curves of said variances are superimposed upon one another by offsetting the mean of each distribution. Non-overlapped areas under the overlapping normal distribution curves are measured. The marbling score regression equation would further include the measurement of the non-overlapped areas under the overlapping normal distribution curves as an independent variable. The method can be used when the ultrasonic scan image input is either longitudinal or transverse with respect to a backbone of the animal or carcass.

A computer algorithm was developed for searching the outline of the longissimus dorsi muscle from cross-sectional ultrasonic images of beef and swine. The ultrasonic image was first averaged to reduce the noise contained in the image. The resultant image was shifted down and right a small number of pixels and subtracted from the original image to obtain the absolute difference image as a measure of the slope of the brightness trend. The effect of this preprocessing was in reality obtained by a specially designed convolution kernel for efficient operations. The absolute difference image was then divided into small windows for searching the outline of longissimus dorsi muscle within a hypothetical ellipse. A modified version of the Brink's correlation was introduced for the optimal threshold selections. The detected outline of the muscle was smoothed by running medians. The resulting row and column locations were then used to compute the enclosed area, which was compared with the l.d. muscle area manually traced with a pointing device. Two sets of ultrasonic images from live beef and swine were utilized to verify this algorithm and the results were presented.

The present invention teaches a method for detecting an outline of a muscle from an ultrasonic image of an animal or carcass. An input is provided of an ultrasonic scan image including the outline of the muscle of the animal or carcass comprising rows and columns of gray level pixel data. An averaged image is created by replacing the gray level data for each of the pixels with an average of neighboring pixel gray levels. A shift and difference image is created by: 1) creating a shifted image by shifting the averaged image vertically and horizontally, 2) creating a first resultant image by subtracting the shifted image from the averaged image, 3) creating a second resultant image by subtracting the averaged image from the shifted image, 4) combining the first and second resultant images to create the shift and difference image. A bilevel image is created by selecting a threshold for converting each gray level value of each pixel to one of two levels and using the threshold to convert the gray level values to bilevel values. An initial window of rows and columns of pixels is selected within the bilevel image. Subwindows are defined within the initial window such that each of the subwindows includes a portion of the outline. The outline within each of the subwindows is detected by searching the subwindow for rows or columns containing a higher ratio of bilevel pixels than a selected threshold ratio specific to each subwindow or higher. The outline detections in each of the subwindows are combined to provide a representation of the muscle outline. An output is provided of the representation of the muscle outline corresponding to the image input. The method can include calculating an area within the outline representation and providing an output of the calculated area. The threshold for converting gray level values to bilevel values is selected at such a level that maximizes the correlation coefficient between the shift and difference image and the bilevel image.

These and other objects, features and advantages of the present invention should become apparent from the following description when taken in conjunction with the accompanying drawings.

BRIEF DESCRIPTION OF THE DRAWINGS

FIGS. 5a–5e are illustrations of edge enhancement by image shift and difference.

FIGS. 6a and 6b are illustrations of convolution kernels for the image average, shift and difference edge enhancement.

FIG. 7 is an illustration of an entire window for fat depth and longissimus dorsi muscle area measurements. The default size is (R0, C0, RS, CS)=(50, 80, 320, 288).

FIG. 8 is an illustration of a window for searching the top of the longissimus dorsi muscle. The arrows represent searching direction.

FIG. 12 is an illustration of a window and sub-windows of the longissimus dorsi muscle. The arrows represent searching directions.

FIG. 13 is an illustration of an irregular polygon with directed coordinates on an image coordinate system.

DETAILED DESCRIPTION OF THE PREFERRED EMBODIMENTS

Figure 1:
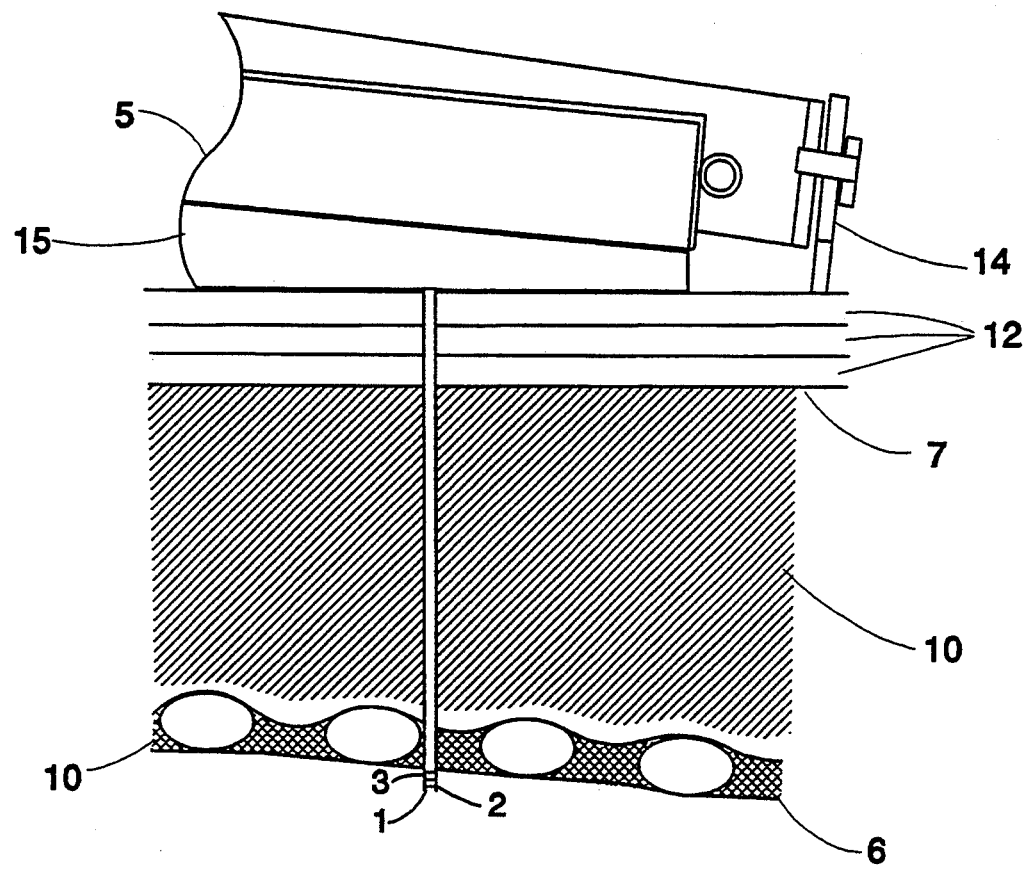
FIG. 1 shows a representation of an ultrasonic image being taken of a longissimus dorsi muscle.

For the purposes of promoting an understanding of the teachings of the present invention, references will now be made to the embodiments illustrated in the drawings and specific language will be used to describe these embodiments. It will nevertheless be understood that no limitation of the scope of the invention is thereby intended, alterations and further applications of the teachings of the present invention as illustrated and described hereinabove is anticipated by those skilled in this art.

Several computer algorithms have been developed for subcutaneous fat thickness, longissimus dorsi muscle area, and intramuscular fat or marbling measurements from ultrasonic images of live animal and carcasses [Aneshansley et al., 1990; Berlow et al., 1989a; and Thane et al., 1989]. Little effort, however, has been devoted to implement the algorithms for application or reutilization. This is partly because some algorithms did not work very well and partly because some software programmed with the algorithm was intended for self verification only and not developed in any sense for further utilization. Those kinds of software alone with algorithms are eventually not reusable. Very few algorithms published in the literature are presented in sufficient detail or in the form that is ready to apply. Furthermore, automating a process using even well-documented algorithms require many more factors to be considered. Some of those considerations include the following: How fast or slow shall the automated system operate to match a particular application? How shall it differentiate images from each other? How can it tell whether or not there is a desired image? All these questions need to be answered, without mentioning all the parameters which actually control the inside of the operation. To develop an automated system for real-time operation, speed, of course, is the major factor to be considered. The current chain speed of a large commercial abattoir can be as high as 1200 hogs or 400 beef per hour. This speed must be matched for practical application of an automated meat grading system in commercial slaughter houses. the system. The final product is a stand-alone executable software package. It can be executed on the PC DOS environment with the necessary hardware.

Ultrasonic Equipment. The equipment used to acquire ultrasonic images from beef and swine was a real time ultrasonic scanner Aloka SSD-500V with 3.5 Mhz linear array transducers [Aloka, 1990a, 1990b and 1990c]. The images can be recorded in VHS video tapes with a regular video cassette recorder and then played back for processing. The video output on the ultrasonic unit will normally connect to the image grabber board for immediate processing in an permanent on-line operation.

Image location and size. A full-size image is 512 rows by 512 columns with its origin (row 0 and column 0) located at the upper-left corner of the image monitor. The rows increment downwards and columns increment right both from 0 to 511. The last 32 rows, however, are invisible in the 110 volts and 60 Hz electricity system. Therefore, a visible image has the maximum size limited to 480 rows by 512 columns in this system.

Pixel and gray value. Each picture element (pixel) of an image can be identified by its row and column coordinates. A numerical value assigned to a pixel is called gray value. A digitized ultrasonic image used for verification purposes and discussed in this specification has 256 ($2^8$) gray levels (8 bits in depth) with level 0 representing black and level 255 representing white. Thus each pixel requires 1 byte (1 byte=8 bits) to store its gray value.

Size of a digitized image file. A digitized image can be saved in a computer file. As mentioned above, the full-size image is 512 rows by 512 columns and each of the resolution cells (or pixel) needs 1 byte to store its gray value. In addition, each image requires a header of size 512 bytes to store information about the image format. Hence, the total storage required to save a full-size image is 512*512*1+512, i.e., 262656 bytes.

Ultrasonic Image Orientation and Locations. The orientation of the ultrasonic image acquired with model SSD-500V is normally shown with the transducer at the top and ultrasonic waves travelling vertically from the top downward. The lateral orientation of image can be inverted either with changing the transducer position or pressing the image direction switch in the scanner keyboard. The image of the scanned tissue is displayed on the middle area of the image monitor with some 360 rows and 288 columns and its upper-left corner at row 28 and column 80 as shown. When a transducer guide is used for a cross-sectional scanning, the viewing area is about 320 rows starting at row 50.

The present invention can be used in a variety of embodiments. In the way of example, the study of the longissimus dorsi muscle (rib eye) of beef and swine is discussed herein. The characteristics of this muscle are currently the most important in determining the value of an animal or carcass. Both longitudinal and cross-sectional (transverse) images with respect to backbone of the animal or carcass are used in evaluation. Various positioning devices can assist in proper and consistent positioning of the ultrasonic transducer.

MEASURING THE THICKNESS OF THE MUSCLE AND OF THE FAT BETWEEN MUSCLE AND THE SKIN

Various edge detection algorithms for processing images have been developed, and most of them are typically modelled to detect a step edge in some optimal way. Detecting ideal step edges is a simple process. In real images, however, noise corrupts the edges and thus makes the edge detection a rather complicated process. Although a considerable amount of research has been done in developing quantitative models for edge detection [e.g. Lee and Yang, 1989; Huang and Tseng, 1988; Souza, 1983; and Davis and Mitiche, 1980], very little work has been devoted to developing statistical models for images without The present invention introduces an automated system for ultrasonic carcass evaluation. The suggested hardware and software are listed below. The algorithms adapted in the system are given a brief description and the ideas behind the algorithms are discussed in detail. The source code of the algorithms can be written in "C". The major factors and problems associated with the automation process are discussed and solved herein.

HARDWARE AND SOFTWARE RECOMMENDATIONS

Image Processing Hardware. The image processing hardware used for the verification of the teachings of the present invention included an arithmetic frame grabber board [DT2862, 1990], an image display device [Panasonic, 1990], and an auxiliary frame processor [DT2858, 1988]. The image display device was necessary for viewing images during the process of developing the system. Once the system was developed, the display became optional. The frame processor greatly reduced the time required to accomplish arithmetic-intensive operations on 512×512 image frames. The DT2858, for instance, completes a 3×3 convolution (i.e. 3 by 3 neighborhood average) on a 512×512×16 bit image at a rate 250 times faster than the IBM PC/AT [DT2858, 1988]. It was used intensively during the stage of algorithm development and was required for efficient operation. The system could be designed to work without the frame processor, but might be slower.

Computer Hardware. The host computer hardware used in the system was an AST Premium/386C 20 Mhz microcomputer, equipped with a math coprocessor (Intel 387 DX-20, Intel Corporation, 5200 N.E. Elam Young Parkway, Hillsboro, Oreg. 97124), a VGA monitor, a 40 MB hard disk, and two floppy disk drives. The computer must be an IBM PC/AT compatible model in order to use the DT2862 image grabber board.

Software requirement. DT-IRIS subroutine library for image processing [DT-IRIS, 1989] and Microsoft C 6.00 programming language [MSC, 1990] have been used to develop assuming noise independence of neighboring pixels. The random and independence assumption about noise may be appropriate for some images with electrical noise but not appropriate for images with speckle noise such as radar images and ultrasound B-Mode images [Lake, 1991; Lee, 1981; and Burckhardt, 1978]. Regardless of the noise independence, algorithms operating on a large area are less sensitive to noise but require more computation.

The present invention teaches a process of measuring the distance between two detected boundaries and applies this technique as a method for on-line high speed evaluation of fat thickness in animal carcasses. Computational efficiency, therefore, is the major concern in developing the technique. An approach to the problem is, as Ehrich and Schroeder noted [Ehrich and Schroeder, 1981], to adopt a one-dimensional approach and consider a one-dimensional profile only. Davis and Mitiche [Davis and Mitiche, 1980] considered the problem of detecting edges in textures with the one-dimensional case. Souza [1983] also discussed several sliding statistical tests for edge detection and adopted the one-dimensional approach to rib detection in chest radiographs as an example. The present invention adopts the one-dimensional concept but differs from these approaches cited above in that a new one-dimensional sliding Z-test algorithm is proposed for both edge and peak detection. This algorithm requires the standard deviation of the whole area of interest in an image to be calculated only once. It not only simplifies the problem of edge detection but it is also very computationally efficient.

A secondary concern comes from the ultrasonic images per se. Since ultrasonic images obtained with a simple linear or sector transducer show a granular appearance, called "speckle" [Burckhardt, 1978], it is known that in theory speckle noise is statistically correlated. One way to determine the statistical dependence is to compare the correlation coefficients of neighboring pixels based on experimental observations [Lee, 1981].

A brief description of Z-test will be given, followed by the description of edge detector and derivations of its expected value and variance together with analyses and determination of the unknown parameters. Finally the results of applying this technique to a set of ultrasonic images and the summary are presented.

Z-test. The Z-test [Snedecor and Cochran, 1982] is based upon standard normal distribution which is completely determined by its mean $\mu$ and standard deviation $\sigma$. Any normally distributed variable X can be standardized to be a new variable Z with its mean equal to zero and standard deviation equal to one by the following simple formula, $$Z = \frac{X - \mu}{\sigma}. \tag{1}$$

The quantity Z is called standard normal deviate. The Z-test is performed simply by computing the Z value and testing it against its corresponding cumulative normal probability.

The most important features about the normal Z-test are that a population or a sampled population has its unique $\mu$ and $\sigma$, and that the distribution of a sample mean from it tends to become normal under random sampling as the size of sample increases even if the distribution in the original population is not normal, as illustrated by the central limit theorem [Mood et al., 1974]. The Sigma filter [Lee, 1983], which is used as a smoothing technique for image noise, is based on the normal probability distribution. Davis and Mitiche [1980] have developed image texture models for minimum error edge detection with an edge operator that is also assumed to be normally distributed.

Sliding Z-test. Sliding Z-test, a new one-dimensional edge and peak detector based on Z-test, is presented. A one-dimensional edge detector in textures and reasons for considering a one-dimensional edge detector have been discussed [Davis and Mitiche, 1980].

A one-dimensional edge detector is based on differences of averages between adjacent, symmetric one-dimensional image neighborhoods. Consider a line of 2n pixels with its center denoted as location i. Let $x_1, x_2, \ldots, x_n$ denote gray levels of the first n pixel gray values, $y_1, y_2, \ldots, y_n$ denote gray levels of the next n pixel gray values in the line image; $\bar{x}$ and $\bar{y}$ denote their respective means. Then the magnitude of the edge operator is defined as $$d_i = \bar{x} - \bar{y} \tag{2}$$

$$= \frac{\sum_{j=1}^{n} x_j}{n} - \frac{\sum_{j=1}^{n} y_j}{n}.$$

Our null hypothesis is that the sample values for any two adjacent neighborhoods come from the same normal distribution. Obviously it will be rejected if point i is at or near an edge. Under this hypothesis, sliding Z-test procedure involves the following three steps in detecting edges, in which $E[d_i]$ and $\sigma[d_i]$ denote the expected mean and standard deviation of $d_i$, respectively:

(1) Compute $Z_i = |d_i - E[d_i]| / \sigma[d_i]$ for all points i in the one-dimensional profile.

(2) Ignore location i where $Z_i < t$, The value t is a significant thresholding value which needs to be decided.

(3) Ignore location i where $Z_i < Z_{i+j}$, $j = \pm 1$.

Step 2, the thresholding step, is intended to discriminate between points which are edges or close to edges and points which are far from edges. Step 3, the non-maxima suppression step, is intended to discriminate between points which are edges and points which are close to edges. Since $d_i$ is large not only at edges but also near edges, omitting Step 3 would result in a cluster of detections about each true edge point [Davis and Mitiche, 1980].

Performing this edge detection procedure involves computing the expected mean, $E[d_i]$, and variance, $\sigma^2[d_i]$, of $d_i$ and choosing n and t in such a way that the overall probability of erroneously classifying an interior point as an edge point $(E_1)$ or an edge point as an interior point $(E_2)$ is minimal. A minimum error thresholding procedure can be found elsewhere [Davis and Mitiche, 1980; Gonzalez and Wintz, 1987].

It is worth noting that computation of the sliding Z-test can be carried out very efficiently by noting that $$d_{i+1} = d_i - \frac{x_1 - 2y_1 + y_{n+1}}{n}. \tag{3}$$

This indicates that $d_i$ can be computed in a constant number of operations per pixel, independent of n.

Analysis of edge magnitude $d_i$. For simplicity, suppose that the area of interest (AOI) in an image contains only two principal brightness regions: one for the dark regions corresponding to the background and one for the light regions corresponding to the bright boundary bands in the AOI. In this case the AOI is the sum or mixture of the two unimodel densities, whose brightness level is proportional to the brightness levels of the two principal regions. If a prior probability of one of the two regions is known or assumed, then the AOI overall average brightness level $(\mu_0)$ is given by $$\mu_0 = P_1 \mu_1 + P_2 \mu_2, \tag{4}$$

where $\mu_1$ and $\mu_2$ are the mean values of the dark and light regions with $\mu_2 > \mu_2$, and $P_1$ and $P_2$ are the prior probabilities of the dark and light regions, respectively, with the constraint $P_1 + P_2 = 1$. The overall variance $\sigma_0^2$ about the mean $\mu_0$ in the AOI is $$\sigma_0^2 = \text{Var}(f_i = \mu_0) = \text{Var}(f_i - P_1 \mu_1 - P_2 \mu_2), \tag{5}$$

where $f_i$ is the gray level at pixel i, $i = 1, 2, \ldots, N$, with N indicating the total points in the AOI. After rearrangement and simplification with Equation 4, Equation 5 becomes $$\sigma_0^2 = P_1 \sigma_1^2 + P_2 \sigma_2^2 + \frac{P_1}{P_2} (\mu_0 - \mu_1)^2, \tag{6}$$

where $\sigma_1^2$ and $\sigma_2^2$ are the variance about the means $\mu_1$ and $\mu_2$, respectively. In the following section for deriving the variance of $d_i$, it is assumed that the variances of the two principal regions are identical, denoted by the common variance $\sigma^2$, i.e., $\sigma_1^2 = \sigma_2^2 = \sigma^2$. Thus, with $P_1 + P_2 = 1$, $$\sigma_0^2 = \sigma^2 + \frac{P_1}{P_2}(\mu_0 - \mu_1)^2. \quad (7)$$

If the identical variance assumption is not appropriate, the slope model with F statistic [Haralick, 1980] might be one of the alternatives. In the following sections the expected value and the variance of $d_i$ will be derived and $d_i$ will be expressed in terms of $P_1$, $P_2$, $\sigma_0^2$ and simple correlations of neighboring pixels.

The Expected Value of $d_i$, $E[d_i]$. By definition, the expected value of $d_i$ is $$E[d_i] = E[\bar{x} - \bar{y}] \quad (8)$$

$$= E\left[\frac{\sum_{j=1}^{n} x_j}{n} - \frac{\sum_{j=1}^{n} y_j}{n}\right]$$

$$= \frac{1}{n}\left(\sum_{j=1}^{n} E[x_j] - \sum_{j=1}^{n} E[y_j]\right).$$

Under the null hypothesis that $x_j$ and $y_j$, $j=1,2,\ldots,n$, are drawn from the same distribution (either the dark regions or the light regions), the expected values are all the same, and thus $E[x_j]=E[y_j]$, $j=1, 2, \ldots,$ n for all points in that region. Therefore $E[d_i|i$ is in the dark or light region$]=0$. Now if all or part of $x_j$ and/or $y_j$, $j=1,2,\ldots,n$, are drawn from the different distributions (cross the dark and light regions) and thus i is an edge or near edge point, then the expected value of $x_j$ and $y_j$ may or may not be equal, depending upon the size of n and the pattern distributions of the dark region and the light region. Hence, $|E[d_i|i$ is an edge or near edge point$]| \geq 0$. Davis and Mitiche [1980] should be consulted for an exact solution of $E[d_i]$ given i is an edge or near edge point. But to be consistent with the null hypothesis, taking the expected value of $d_i$ as 0 would not be invalid particularly for the view of image processing since any $d_i$ significantly different from 0 would be of interest and should be detected by the sliding Z-test. Therefore, it will be assumed under the null hypothesis that $E[d_i]=0$ for $i=1, 2, \ldots, N$.

The Variance of $d_i$, $\sigma^2[d_i]$. The variance of $d_i$ is given by:

$$\begin{aligned}\sigma^2[d_i] &= Var[d_i] \\ &= Var[\bar{x} - \bar{y}] \\ &= \sigma^2[\bar{x}] + \sigma^2[\bar{y}] - 2\tau_{x,y}\sigma[\bar{x}]\sigma[\bar{y}].\end{aligned} \quad (9)$$

where $\tau_{x,y}$ is the correlation between $\bar{x}$ and $\bar{y}$. It is not assumed that the adjacent neighborhoods are independent. If they are independent, $\tau_{x,y}$ would be 0. Under the null hypothesis, $\sigma^2[\bar{x}]=\sigma^2[\bar{y}]$. Denoted by a common variance $\sigma^2[\bar{g}]$, Equation 9 becomes $$\sigma^2[d_i] = 2(1-\tau_{x,y})\sigma^2[\bar{g}], \quad (10)$$

where $$\bar{g} = \frac{1}{n}\sum_{j=1}^{n} f_j. \quad (11)$$

Under the null hypothesis, the variance of $d_i$ given by Equation 10 is the variance for all i, $i=1, 2, \ldots, N$.

From Equation 11, the variance of $\bar{g}$, $\sigma^2[\bar{g}]$, can be derived in terms of simple correlations of neighboring pixels and the common variance $\sigma^2$ of the two principal regions.

$$\sigma^2[\bar{g}] = Var\left(\frac{\sum_{j=1}^{n} f_j}{n}\right) \quad (12)$$

$$= \frac{Var\left(\sum_{j=1}^{n} f_j\right)}{n^2}$$

$$= \left(\frac{1}{n} + \frac{2\sum_{j=1}^{n-1}\sum_{k=1}^{n-j}\tau_{jj+k}}{n^2}\right)\sigma^2,$$

where $\tau_{jj+k}$ is the correlation between pixel j and pixel j+k. There are n!/2 possible correlations, $\tau T_{jj+k}$, involved to compute the variance of $\bar{g}$ without the assumption of neighborhood independence. For simplicity, it is reasonable to assume that the correlation of two pixels in a fixed distance is invariant for a particular set of images. Mathematically speaking, it is assumed that $\tau_{1,1+k}$ is equal to $\tau_{jj+k}$ for any j and k ($j=1, 2, \ldots, n-k$; $k=1, 2, \ldots, n-1$) with $T_{1,1+k}$ representing the correlation between a pixel and its kth neighbor. By letting $\rho_k$ denote $\tau_{1,1+k}$, it can be established that there will be $n-1$ $\rho_1$'s, $n-2$ $\rho_2$'s, $\ldots$, and one $\rho_{n-1}$. This assumption, consequently, reduces the number of possible correlations among the n points from n!/2 to $n-1$. Hence the variance of $\bar{g}$, $\sigma^2[\bar{g}]$, is given by:

$$\sigma^2[\bar{g}] = \left(\frac{1}{n} + \frac{2\sum_{j=1}^{n-1}(n-j)\rho_j}{n^2}\right)\sigma^2. \quad (13)$$

It can also be shown that the correlation between the averages of adjacent, symmetric neighborhoods $\bar{x}$ and $\bar{y}$ is a function of the simple correlations between the 2n pixels involved in $\bar{x}$ and $\bar{y}$.

$$\tau_{x,y} = \frac{\sum_{j=1}^{n} j\rho_j + \sum_{j=1}^{n-1}(n-j)\rho_{n+j}}{n + 2\sum_{j=1}^{n-1}(n-j)\rho_j}.$$

These correlations of neighboring pixels must be established either theoretically or experimentally. Because of the complexities and diversities associated with digital images, most statistical models of image noise assume that the noise intensity between pixels is not correlated. The neighborhood correlations will be determined experimentally in the next section.

The common variance $\sigma^2$ of the two principal regions in Equation 13 is an unknown parameter. At the beginning of this section, the overall variance $\sigma_0^2$ has been partitioned into two parts in Equation 7. The difference $\mu_0-\mu_1$ in Equation 7 can be approximated by using the optimal thresholding technique [Gonzalez and Wintz, 1987] to solve $\sigma^2$. From the definitions of $\mu_0$, $\mu_1$ and $\mu_2$ and Equation 4, it can be shown that $\mu_1 < \mu_0 < \mu_2$ and that $$\mu_2 - \mu_1 = \frac{\mu_0 - \mu_1}{P_2}. \quad (15)$$

Thus a threshold T may be defined so that all pixels with a gray value below T are considered dark points and all pixels with a value above T are consider light points. Based on the minimal error thresholding formula in [Gonzalez and Wintz, 1987] with identical variance $\sigma^2$ for the two regions, the optimal solution for T is $$T = \frac{\mu_1 + \mu_2}{2} + \frac{\sigma^2}{\mu_1 - \mu_2} \ln\left(\frac{P_2}{P_1}\right). \quad (16)$$

Furthermore, suppose that T is $Z_0$ normal deviates greater than $\mu_1$, based on the concept of statistical significant test, that is, $$T = \mu_1 + Z_0 \sigma. \quad (17)$$

Combining Equations 15, 16 and 17 with rearrangement and simplification yields the following:

$$\mu_0 - \mu_1 = P_2\left(Z_0 + \sqrt{Z_0^2 + 2\ln\left(\frac{P_2}{P_1}\right)}\right)\sigma \quad (18)$$
$$= C\sigma,$$

where $$C = P_2\left(Z_0 + \sqrt{Z_0^2 + 2\ln\left(\frac{P_2}{P_1}\right)}\right). \quad (19)$$

Replacing $\mu_0 - \mu_1$ with $C\sigma$ and solving for $\sigma^2$ from $\sigma_0^2$ in Equation 7 finally give $$\sigma^2 = \frac{\sigma_0^2}{\left(1 + C^2 \frac{P_1}{P_2}\right)}. \quad (20)$$

By joining Equations 13, 14 and 20, the variance of $d_i$, $\sigma^2[d_i]$, in Equation 10 can be expressed as a function of $P_1$, $P_2$, $\sigma_0^2$, $Z_0$, and $2n-1$ neighborhood correlations under the null hypothesis. In order to detect edges using the sliding Z-test as proposed above it is necessary to:

1. determine the prior probabilities of dark and light points $P_1$ and $P_2$;
2. specify significant normal deviates $Z_0$ and t;
3. choose the size of sliding window $2n$;
4. check $2n-1$ neighborhood correlations; and
5. compute $\sigma_0^2$ in the area of interest of an image.

Estimation of Unknown Parameters. Unknown parameters ($P_1$ and $P_2$, $Z_0$ and t, n, $p_i$ with $i = 1, 2, \ldots, 2n-1$) involved in the above sections depend upon the application and the characteristics of a particular kind of images. Hence there is no single solution to all different images. The following methods are suggested to estimate the unknowns.

In determination of the probabilities $P_1$ and $P_2$ in general, it is hoped ideally that based on the definition of the optimal thresholding value T, the probability of a point $f_i$, $i = 1, 2, \ldots, N$, in the dark regions ($P_1$) or in the light regions ($P_2$) are $P_1 = P\{f_i \leq T\}$ and $P_2 = 1 - P_1$ with the assumption that the probability of erroneously classifying either an interior point as an edge point ($E_1$) or an edge point as an interior point ($E_2$) is negligible. In other words, if either the total points with $f_i \leq T$, denoted by $N_1$, or the total points with $f_i > T$, denoted by $N_2$, is known with $N_1 + N_2 = N$, then $P_1$ and $P_2$ can be estimated as follows: $P_1 \approx N_1/N$ and $P_2 \approx N_2/N$. For instance, in characterizing ultrasonic images from animal loin cross section scans for tissue linear measurements, $N_2$ may be estimated by the number of tissue boundaries (b) involved in the area of interest which appear bright in the ultrasonic image and the width of each (represented by $w_k$, $k = 1, 2, \ldots, b$), that is $$N_2 = \sum_{k=1}^{b} w_k. \quad (21)$$

In determining the value of n, the minimum of $w_k$, $k = 1, 2, \ldots, b$, is chosen, based on both the findings of [Davis and Mitiche, 1980] and the consideration of reserving the characteristics of an edge. Symbolically, $n = \min\{w_k, k = 1, 2, \ldots, b\}$. An n too small or too large will increase the probability of error $E_1$ or $E_2$ [Davis and Mitiche, 1980]. By a careful examination of several images used in the discovery of the present invention, it was found that n less than 3 or greater than 10 did not work well for fat depth measurements since most boundary bands were averaged 5 pixels wide in those images. The standard normal deviates $Z_0$ for optimal thresholding and t for sliding Z-test process can be determined based on normal distribution. $Z_0 = t = 3$ has been used with a great success in several sets of animal ultrasonic images. This value is recommended since it means that 99.87% of points in the AOI of an image would be correctly classified and that with non-maxima depression step (Step 3 in Sliding Z-test) this probability should be even higher.

As mentioned earlier, speckle noise such as that of ultrasound can not be presumed statistically independent [Burckhardt, 1978]. One simple method to determine the independence is to compare the correlation coefficients [Lee, 1981]. Correlations of neighboring pixels in an image could be determined based on individual images by adopting the formula given in [Lee, 1981]. The $r_{0,1}$ is the correlation coefficient of a pixel and its immediate right neighbor. The $r_{k,0}$ is the estimate of $\rho_k$, $k = 1, 2, \ldots$, when the sliding Z-test is used to detect vertical edges while the $r_{0,k}$ is the estimate of $\rho_k$, $k = 1, 2, \ldots$, when the sliding Z-test is used to detect horizontal edges. The results indicate that pixels have high correlations with their neighbors and the correlations decrease with pixels farther away. More than 20 images with the same size of window have been tested and the results are similar to the above. Hence it may be reasonable to assume that the correlation between two pixels of a fixed distance is invariant for a particular set of images, independent of the region (either the light or dark region) in which it has been calculated. Making such an assumption will substantially save time on computation but it may not be valid for other images. It is interesting to note that vertical correlations are consistently lower than horizontal ones. This may be because the horizontally oriented, linearly arrayed elements of the transducer used herein [Aloka 1990a and 1990b] produce similar ultrasonic waves which attenuate differently, while travelling in the direction normal to the transducer face, depending on the characteristics of the scanned materials.

Application

Figure 2:
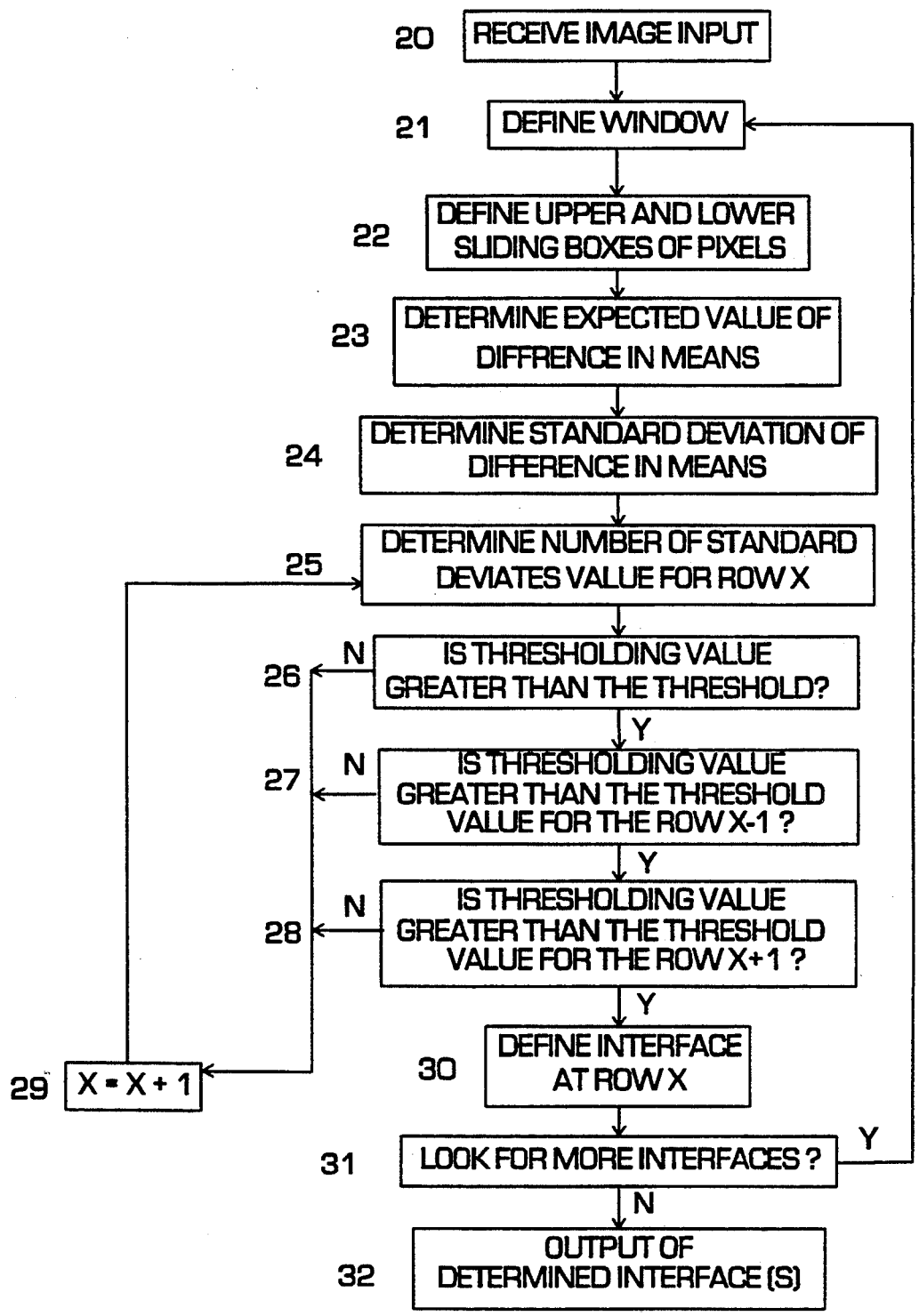
FIG. 2 is a flow chart of the basic steps in the method of determining interfaces within an ultrasonic scan image taught by the present invention.

The present invention teaches a method of automatically recognizing fat and muscle interfaces of an animal or carcass from an ultrasonic image of a muscle and fat area. FIG. 1 shows a representation of an ultrasonic image of a longissimus dorsi muscle. The transducer 5 is positioned in a longitudinal direction with respect to the animal's backbone. FIG. 2 is a flow chart of the basic steps to determining an interface within the image. An input is provided of an ultrasonic scan image of the muscle and fat area of the animal or carcass comprising rows and columns of pixel data. (Box 20) A window of rows and columns of pixels within the image input is selected. (Box 21) The window 1 includes a lower box of pixels 2 and an upper box of pixels 3. (Box 22)

Scanning upward through the window 1, starting at a point in the bottom row of pixels within the window, an interface 6 is determined. The sliding lower box of pixels 2 and the adjacent sliding upper box of pixels 3 are defined to move up through the window 1 one row at a time at least until the interface 6 is determined. The expected value (Box 23) and the standard deviation (Box 24) of the difference between the means of the gray levels of the pixels within the sliding lower box 2 and the sliding upper box 3 are calculated. A number of normal deviates value is calculated (Box 25) for each row of pixels moving upwards through the window, wherein the number of normal deviates value is computed by dividing the absolute value of the difference of the means of the gray levels of the pixels within the sliding lower box and the upper box less the computed expected value, by the computed standard deviation. The interface 6 is defined at a specified row of pixels when the number of normal deviates value for the specified row of pixels is greater than both a predefined interface threshold (Box 26) and is greater than the number of normal deviates value calculated for the row of pixels one row lower (Box 27) and one row higher (Box 28) than the specified row of pixels. If any of these criterion are not met then the process proceeds from one row higher. (Box 29) Otherwise the interface has been determined. (Box 30) A second interface 7 can be determined by scanning upward through the window beginning at a point above the determined first interface 6. (Box 31) Then an output of the determined interfaces 6 and 7 is provided. (Box 31) The method can assume that the expected value of the difference between the means of the gray levels of the pixels within the sliding lower box 2 and the sliding upper box 3 equal 0 and that the standard deviation of the means of the gray levels of the pixels within the sliding lower box 2 and the sliding upper box 3 are equal.

The method has been used to locate interfaces when wherein an ultrasonic transducer was centered over the last few ribs of the animal or carcass and the ultrasonic image is of a ribline 10, a longissimus dorsi muscle 11 and fat layers 12 above the muscle 11 such that the specified window 1 starts below the ribline 10 of the animal or carcass. A fat depth was determined from a distance between the second interface line 7 and a specified plane of contact between the animal or carcass and the ultrasonic transducer 5 adjusted for any positioning equipment 14 or stand-off gel 15. A muscle depth was determined from a distance between the first and second interfaces lines 6 and 7. The output of the system included the fat depth and the muscle depth for the animal or carcass from which the image was taken. The method can be used when the ultrasonic scan image input is either longitudinal (as shown in FIG. 1) or transverse with respect to a backbone of the animal or carcass.

A total of 220 loin cross-sectional images from two sets of swine populations and 15 rib cross-sectional images from a beef population acquired with the ultrasonic scanner model SSD-500V and 3.5 MHz transducers [Aloka, 1990a and 1990b] were processed using the developed technique.

The area of interest in the image was specified according to the conventional location for fat measurements in swine and beef, which was approximately at the 50th row and 232nd column for its upper left corner and the 219th row and 271st column for its lower right corner in the image, giving N=170×40. The 170 rows in depth was large enough to cover all possible subcutaneous-fat-tissue-involved interfaces interested in the images. The sliding Z-test was to cross these rows to detect edges in the images.

Since this technique is one-dimensional, any box width greater than one column is for making multiple measurements. How wide the area should be depends primarily upon the quality of the image as well as a particular application.

The width of 40 columns was used for transverse images based on the fact that some noise and artifacts could be as wide as 20 columns (most often 2 to 8 columns wide) in those images. Of these 40 columns 10 measurements were made (one every 4 columns) and the 2 highest and 2 lowest values were eliminated. The remaining measurements were averaged and this average was used to compare with its corresponding manual measurement. This edge detection procedure is now used to detect interfaces in longitudinally scanned images with amazing success. When using this technique in longitudinal scans multiple measurements could be made across the image.

In order to estimate the unknown parameters involved in the sliding Z-test algorithm, it is necessary to consider the following possible interfaces among the ultrasonic transducer and the underneath tissues in swine, which appear bright in the ultrasonic image. There are three visible fat layer in swine images but only two visible fat layers in beef images. The average width of each bright interface band was determined based on the histogram analyses of more than 20 various images. The minimum of these widths, 3, was the number of pixels used to compute the average in each side of the sliding window. $Z_0 = t = 3$, the standard normal deviates, was used based on normal distribution assumption.

Computer estimated total skin and fat thicknesses were correlated with the measurements made manually from the same images. The results of comparisons between the two measurements along with their physical carcass measurements (when available) are listed in Table 1.

TABLE 1

The results of comparisons among the computer, manual, and carcass fat thickness measurements.[1]

| No. | Regression Equation | RSE* | r** |
|---|---|---|---|
| | Hogs from Univ. of Missouri: N = 125 | | |
| 1 | Manu. Fat = 0.15 + 1.04 Comp. Fat[ΛΛ] | 0.274 | 0.946 |
| | Hogs from Hormel: N = 95 | | |
| 2 | Manu. Fat & = 0.15 + 0.90 Comp. Fat | 0.419 | 0.857 |
| 3 | Carc. Fat = 0.53 + 0.84 Manu. Fat | 0.462 | 0.829 |

TABLE 1-continued

The results of comparisons among the computer, manual, and carcass fat thickness measurements.[1]

| No. | Regression Equation | RSE* | r** |
|---|---|---|---|
| 4 | Carc. Fat 0.58 + 0.79 Comp. Fat Beef from Univ. of Wisconsin: N = 15 | 0.559 | 0.737 |
| 5 | Manu. Fat = −0.43 + 0.89 Comp. Fat | 0.160 | 0.921 |
| 6 | Carc. Fat = −0.89 + 1.32 Comp. Fat | 0.257 | 0.910 |
| 7 | Carc. Fat = −0.03 + 1.26 Manu. Fat | 0.338 | 0.836 |

[1]see APPENDIX A for more details about the samples.
*RSE: Residual Standard Error, cm.
**r: Pearson correlation coefficient, dimensionless.
[A]Manu. Fat: Fat thickness measured manually from the ultrasonic images, cm.
[AA]Comp. Fat: Fat thickness estimated by the computer from the same ultrasonic images as for Manu. Fat, cm.
& Carc. Fat: Fat thickness physically measured from the carcasses when the animals were slaughtered, cm.

The conversion factors from row pixels to centimeters are transducer dependent, which can be easily determined from the scales shown on the image. For transducer UST-5011U-3.5 MHz, one cm is equivalent to 30.20 rows and for transducer UST-5044U-3.5 MHz, one cm is equivalent to 22.20 rows.

The results of regression analysis showed that the correlations between the computer and manual measurements were no less than 0.86 ($P<0.001$), with both their intercepts not significantly different from zero and slopes not significantly different from unity ($P>0.05$). As expected, the computer measurements appeared better correlated with manual measurements made from the ultrasonic images than with actual measurements made from the animal carcasses but the correlations did not differ significantly ($P>0.05$).

AUTOCORRELATION OF ULTRASOUND SPECKLE AND ITS RELATIONSHIP TO BEEF MARBLING

The present invention uses the autocorrelations of ultrasound B-mode speckle and relates them to beef carcass marbling scores. A stochastic model of autoregressive process and the Yule-Walker equations are first considered for solving the partial autoregressive coefficients from autocorrelation coefficients. Then the relationship between autocorrelations of ultrasonic image and the actual marbling scores of beef carcass is disclosed based on normal distribution. Methods for estimating the neighborhood autocorrelations, mean and variance of an image are taught. For verification, this model was applied to two sets of ultrasonic images from beef.

An autoregression model. An autoregressive model [Box and Jenkins, 1976; Neter et al., 1983] is considered to first determine the gray value of a pixel value in an image, $f_{ij}$, at the (i,j)th coordinate by its neighbors at coordinates (i−r, j−c), r, c=0, 1, 2, ..., n with r+c>0, and independent chance elements $\epsilon_{ij}$ assuming that small segments of the image plane are stationary, and then derive the variance of $f_{ij}$ in terms of the autoregression coefficients and the variance of $\epsilon_{ij}$. The variances and autocorrelations of ultrasonic images are then related to the marbling scores (MS) of beef carcasses.

$$f_{i,j} = \sum_{r=0}^{n} \sum_{c=0}^{m} \phi_{r,c} f_{i-rj-c} + \epsilon_{i,j}, \quad r+c>0 \tag{22}$$

where $\phi_{r,c}$'s are the autoregression coefficients; $\epsilon_{ij}$ is the independent chance element (white noise) and assumed to be normally distributed with mean zero and variance $\rho^2$; and n and m are the dimension of one quadrant of neighborhoods considered in the autoregressive process. By analyzing several sets of ultrasonic images, it has been found that the correlation between immediate neighboring pixels in the direction normal to ultrasonic wave propagation is almost perfect ($r>0.95$) with considerably small amount of variation ($\sigma^2<0.00017$) and that the correlation between neighboring pixels in the direction of ultrasonic wave propagation varies from image to image. This leads to the assumption that pixels in the direction of ultrasonic wave propagation carry certain information about the variation of characteristics of the tissue and that immediate neighboring pixels in the direction normal to ultrasonic wave penetration bear similar information. Based on this assumption the above model is simplified from two dimensions to one dimension, which is the same as if m=0 is assumed. It is also assumed that the autoregressive process is stationary, that is, the process remains in equilibrium about a constant mean level ($\mu$).

$$f_{i,j} = \mu + \sum_{r=1}^{n} \phi_r (f_{i-rj} - \mu) + \epsilon_{ij}. \tag{23}$$

This reduces the calculation burden considerably since now only the correlations of neighboring pixels in the direction of ultrasonic wave travelling are necessary to be computed.

The simplified model above is an autoregressive model of order n. It can be shown that the variance of $f_{ij}$, $\sigma_0^2$, is $$\sigma_o^2 = \frac{\sigma^2}{1 - \rho_1\phi_1 - \rho_2\phi_2 - \ldots - \rho_n\phi_n}, \tag{24}$$

where $\rho_i$ is the autocorrelation coefficients of a pixel with its ith neighborhood, i=1, 2, ..., n. The autoregression coefficients $\phi_1, \phi_2, \ldots, \phi_n$ can be expressed in terms of autocorrelations $\rho_1, \rho_2, \ldots, \rho_n$ by a set of linear equations called the Yule-Walker equations [Box and Jenkins, 1976]:

$$\Phi_n = P_n^{-1} \rho_n, \tag{25}$$

where $$\Phi_n = \begin{bmatrix} \phi_1 \\ \phi_2 \\ . \\ . \\ . \\ \phi_n \end{bmatrix} \rho_n = \begin{bmatrix} \rho_1 \\ \rho_2 \\ . \\ . \\ . \\ \rho_n \end{bmatrix} \tag{26}$$

$$P_n = \begin{bmatrix} 1 & \rho_1 & \rho_2 & \cdots & \rho_{n-1} \\ \rho_1 & 1 & \rho_1 & \cdots & \rho_{n-2} \\ . & . & . & & . \\ . & . & . & \cdots & . \\ . & . & . & & . \\ \rho_{n-1} & \rho_{n-2} & \rho_{n-3} & \cdots & 1 \end{bmatrix}.$$

In particular, when n=1, it will be noted that $$\rho_1 = \phi_1. \quad (27)$$

The variance of the first order autoregressive process is $$\sigma_o^2 = \frac{\rho^2}{1 - \rho_1^2}. \quad (28)$$

When n=2, the Yule-Walker equations above become $$\rho_1 = \phi_1 + \phi_2 \rho_1$$

$$\rho_2 = \phi_1 \rho_1 + \phi_2, \quad (29)$$

which, when solved for $\phi_1$ and $\phi_2$, give $$\phi_1 = \frac{\rho_1(1 - \rho_2)}{1 - \rho_1^2} \quad (30)$$

$$\phi_2 = \frac{\rho_2 - \rho_1^2}{1 - \rho_1^2}.$$

Hence from Equation 24 the variance of the second order autoregressive process (n=2) is $$\sigma_o^2 = \frac{\rho^2}{1 - \rho_1 \phi_1 - \rho_2 \phi_2}. \quad (31)$$

The autoregressive processes of the first and second order are of considerable practical importance. In the next section the involved statistical parameters will be related to marbling scores of beef carcass.

Statistical parameters of speckle and marbling. Due to lack of knowledge about the detailed microscopic structure of intramuscular fat or marbling from which the ultrasonic wave is scattered, it is necessary to describe the relationship of marbling to speckle properties in statistical terms.

As given in the above section, the variance of $f_{ij}$ in the image of interest, $\sigma_0^2$, and the variance of white noise $\epsilon_{ij}$, $\sigma^2$, are related in the stationary autoregression process, in general, as follows:

$$\sigma_o^2 = \frac{\sigma^2}{C_n^2}, \quad (32)$$

where $$C_n^2 = 1 - \rho_1 \phi_1 - \rho_2 \phi_2 - \ldots - \rho_n \phi_n. \quad (33)$$

Since the white noise $\epsilon_{ij}$ is assumed to be identically, normally distributed with mean 0 and variance $\sigma^2$, the pixel $f_{ij}$ is also identically, normally distributed but with mean $\mu$ and variance $\sigma_0^2$. By offsetting the mean of white noise to $\mu$ and superimposing the two normal distribution on each other as shown in FIG. 3, the absolute difference of the non-overlapped area (Ä) under the two curves can be computed, which is postulated to be a function of the area filled by fat within the l.d. muscle.

The motivation of this concept stems from the fact that the variances $\sigma_0^2$ and $\sigma^2$ will be equal to each other if there is no autocorrelation. (see the above equation). It is well known that speckle noise of ultrasound B-scans is autocorrelated. Speckle noise originates from the rough surfaces which scatter the ultrasonic waves. It is believed that the existence of intramuscular fat (or marbling) particles in the l.d. muscle makes such surfaces extremely rough.

Figure 3:
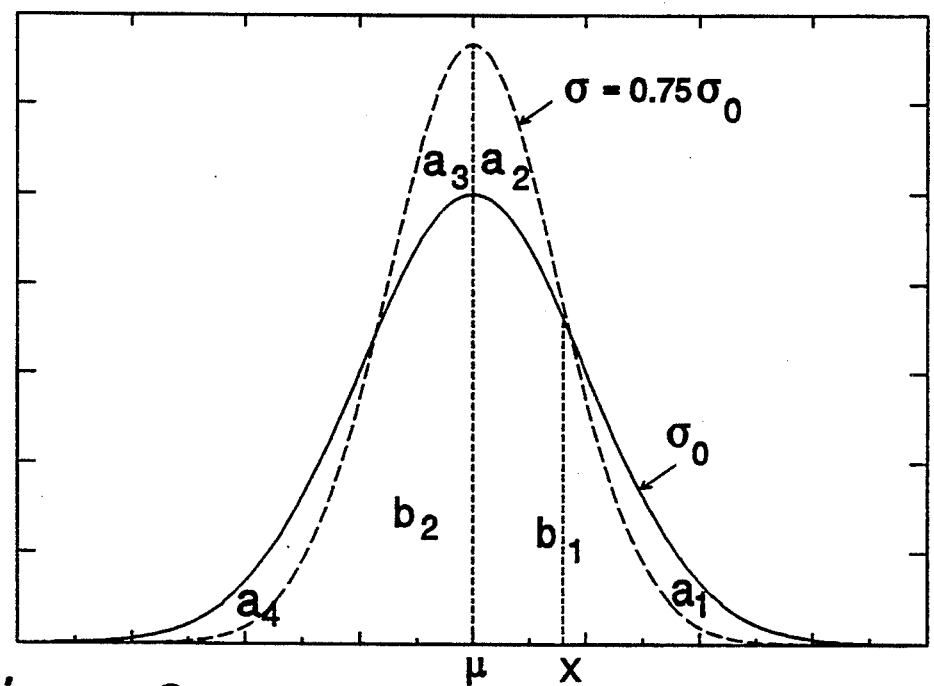
FIG. 3 is a graph of two normal distributions with different variances ($\sigma^2 = 0.75^2 \sigma_0^2$). Note that x is the abscissa of the intersection of the two curves; the non-overlapped areas are equal ($a_1 = a_2 = a_3 = a_4$), the overlapped areas are equal ($b_1 = b_2$), and the whole area under a curve is unity ($a_1 + b_1 + b_2 + a_4 = 1$).

To compute the non-overlapped area between the two curves in FIG. 3, let x denote the abscissa of the intersection of the two curves to the right side of the mean and Ä denote the non-overlapped area $a_1$ (see FIG. 3). The x is determined so that $$\frac{1}{\sigma \sqrt{2\pi}} e^{-\frac{(x-\mu)^2}{2\sigma^2}} = \frac{1}{\sigma_o \sqrt{2\pi}} e^{-\frac{(x-\mu)^2}{2\sigma_o^2}}. \quad (34)$$

By taking natural log both sides and simplifying, the x is solved as follows $$\begin{aligned} x &= \mu_o + Z\sigma \\ &= \mu_o + Z_o \sigma_o, \end{aligned} \quad (35)$$

where $$Z = \sqrt{\frac{\ln C^2}{C^2 - 1}} \text{ and } Z_o = CZ = C\sqrt{\frac{\ln C^2}{C^2 - 1}}. \quad (36)$$

Therefore, Ä will be $$\begin{aligned} A &= \int_{-\infty}^{Z} \frac{1}{\sqrt{2\pi}} e^{-\frac{t^2}{2}} dt - \int_{-\infty}^{Z_o} \frac{1}{\sqrt{2\pi}} e^{-\frac{t^2}{2}} dt \\ &= P\{t < Z\} - P\{t < Z_o\}, \end{aligned} \quad (37)$$

where t is a dummy variable of standard normal distribution. It should be mentioned for clarity that $C_n$ denotes the ratio of variance $\sigma^2$ to variance $\sigma_0^2$ for an autoregression model of order n; in particular, of most practical importance are the first and second order $C_n$, which are, as shown in Equation 33, $$C_1 = \sqrt{1 - \rho_1^2} \text{ and } C_2 = \sqrt{1 - \rho_1 \phi_1 - \rho_2 \phi_2}. \quad (38)$$

Accordingly, there would be $\ddot{A}_1$ and $\ddot{A}_2$, respectively, denoting the non-overlapped areas calculated in the autoregression processes of the first and second order. To justify this theoretical derivation, Ä will be related to the actual marbling score of beef carcass since both are now measures of fat area in some sense. Before doing so, estimation of the parameters necessary for computing Ä will be discussed first in the next section.

Estimation of image variance and autocorrelations. Estimation of the variance and autocorrelations from the area of interest in an image is statistically straightforward. Since the image plane is assumed stationary, the variance $\sigma_0^2$ is simply estimated by $$\sigma_o^2 = \frac{\sum_{i=1}^{N_r} \sum_{j=1}^{N_c} (f_{i,j} - \mu)^2}{N_r N_c}, \mu = \frac{\sum_{i=1}^{N_r} \sum_{j=1}^{N_c} f_{i,j}}{N_r N_c}, \quad (39)$$

where $f_{ij}$ is the gray value of the pixel at the ith row and jth column; $N_r$ is the number of pixels in a row and $N_c$ is the number of pixels in a column for a rectangular area of interest.

The autocorrelation of two pixels of lag k, denoted by $r_k$, is simply estimated by the correlation of a pixel and its kth neighbor. Note that the correlation is estimated from neighboring pixels in the vertical direction which, as mentioned earlier, is the direction the ultrasonic wave propagates.

$$\rho_k = r_k = \frac{\frac{\sum_{i=1}^{N_r-k} \sum_{j=1}^{N_c} f_{i,j} f_{(i+k),j}}{(N_r - k)N_c} - \mu^2}{\sigma_0^2}, \quad (40)$$

If the area specified is irregular, like the shape of the entire cross-sectional area of the l.d. muscle, then $N_r$ would be a vector rather than a scalar. Meanwhile, Equations 39 and 40 need to be modified accordingly in order to correctly compute the neighborhood correlations. A rectangular area is used in this example so that both $N_r$ and $N_c$ are scalars, the easiest way for computing autocorrelations.

When the estimates of the necessary autocorrelations of the area of interest in an image are known from Equation 40, then the autoregression coefficients $\Phi_n$ is solved with Equation 25, $C_n$ is calculated with Equation 33, Z and $Z_0$ are computed with Equation 36, and ultimately the non-overlapped area Ä can be readily calculated using Equation 37, which are related to the actual marbling score of a beef carcass.

Application

Figure 4:
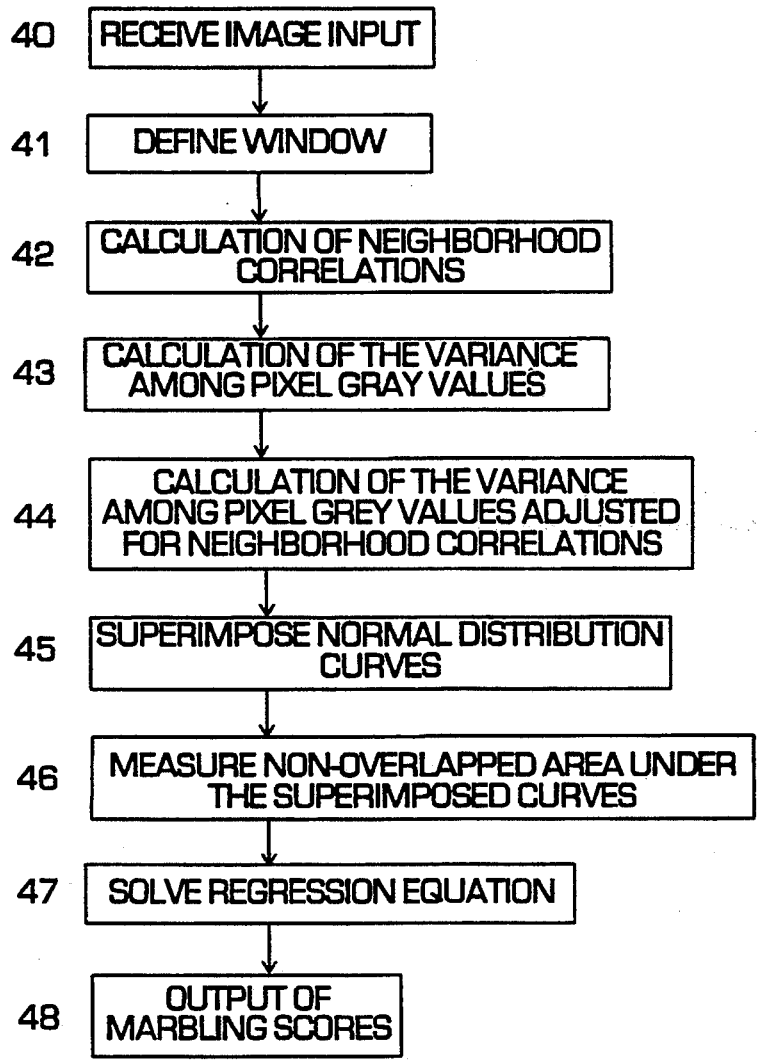
FIG. 4 is a flow chart of the basic steps in the method of determining marbling characteristics from an ultrasonic scan image of a muscle as taught by the present invention.

The present invention includes a method of determining marbling scores of a muscle of an animal or carcass from an ultrasonic image of the muscle. FIG. 4 is a flow chart of the basic steps in applying the method of determining marbling scores taught by the present invention. An input is provided of an ultrasonic scan image of the muscle and fat area of the animal or carcass comprising rows and columns of pixel data. (Box 40) A window of rows and columns of pixels within the image input is selected. (box 41) Correlations between gray values of neighboring pixels within the window are calculated. (Box 42) The method can further include calculating a variance of gray values of pixels within the window (Box 43) and calculating a adjusted variance of gray values of pixels within the window adjusted for the correlations between gray values of neighboring pixels. (Box 44) The normal distribution curves of said variances are superimposed upon one another by offsetting the mean of each distribution. (Box 45) Non-overlapped areas under the overlapping normal distribution curves are measured. (Box 46)

A marbling score regression equation is provided which includes the marbling score as a dependant variable and the correlations between neighboring pixels as an independent variable. The marbling score regression equation could further include the measurement of the non-overlapped areas under the overlapping normal distribution curves as an independent variable. The marbling score regression equation is solved (Box 47) and an output is provided of the marbling score corresponding to the image input. (Box 48).

The method can be used when the ultrasonic scan image input is either longitudinal or transverse with respect to a backbone of the animal or carcass. The method described above was first verified with a set of 15 ultrasonic images from live beef and then the optimum regression model was applied to another beef population for marbling evaluation (see APPENDIX A for more about the samples). The ultrasonic equipment used was Aloka 500V with a 3.5 MHz transducer [Aloka, 1990a and 1990c]. Because of the fact that the speckle noise results from the roughness of surface of ultrasonic wave scatterers and that the interior, homogeneous part of the marbling particles may not be registered as speckle in the ultrasonic image, there is no one-to-one (or perfect) relationship between the non-overlapped area (Ä) and the percentage of total area of fat particles ($P_t$) covering the ribeye muscle. Hence, regression should be used to associate $P_t$ with Ä. Before doing so, it is necessary to convert the marbling score (MS) to $P_t$ since MS is an arbitrary, linear assignment to each of the subjective terms (see Table 2) used by the USDA in beef carcass grading. Table 2 contains two sources that relate these grading terms in an approximate manner to the percentage of area filled by fat in the l.d. muscle [Swatland, 1984; Chen et al., 1989].

TABLE 2

Marbling score (MS), grading terms, and percentage of marbling fat area in the l.d. muscle

| MS | Grading Term used by the USDA | Fat area[1] $P_t$ (%) | Fat area[2] $P_t$ (%) | Predicted $P_t$ ($P_{tp}$) |
|---|---|---|---|---|
| 9 | Very abundant | 25 | — | 25.0 |
| 8 | Abundant | 21 | — | 21.50 |
| 7 | Moderately Abundant | 18 | 18.70 | 18.00 |
| 6 | Slightly Abundant | 15 | 11.60 | 14.50 |
| 5 | Moderate | 11 | 12.80 | 11.00 |
| 4 | Modest | 7.5 | 5.38 | 5.44 |
| 3 | Small | 3 | 2.93 | 3.06 |
| 2 | Slight | 1.5 | 1.21 | 1.36 |
| 1 | Trace | 0.5 | — | 0.34 |
| 0 | Practically Devoid | 0 | — | 0.00 |

[1]from reference Swatland, 1984.
[2]from reference Chen et al., 1989.

The last column in Table 2 contains the predicted $P_t$ ($P_{tp}$) by the following formula summarized from the available data.

$$P_{tp} = 0.34 MS^2, \; MS < 5 = 3.5MS - 6.5, \; MS \geq 5 \quad (41)$$

The order of the autoregressive process (n) was assumed to be equal to 1, 2, or 3. Regression of $P_{tp}$ on Ä was performed for each n with the same group of ultrasonic images (15 beef from University of Wisconsin). The results of regression are shown in Table 3.

TABLE 3

Regressions of marbling fat area percentage on the non-overlapped area from autocorrelations of order 1, 2, and 3 for Beef Group 1.[1]

| No | Regression Equation | RSE | r | Order |
|---|---|---|---|---|
| 8 | $P_{tp} = -0.29 + 43.65 \ddot{A}_1$ | 1.583 | 0.311 | 1 |
| 9 | $P_{tp} = -3.09 + 74.82 \ddot{A}_2$ | 1.365 | 0.574 | 2 |
| 10 | $P_{tp} = -3.24 + 76.60 \ddot{A}_3$ | 1.354 | 0.582 | 3 |
| 11 | $P_{tp} = -2.46 + 317.93 (\ddot{A}_2 - \ddot{A}_1)$ | 0.925 | 0.832 | 2 |
| 12 | $P_{tp} = -2.50 + 313.21 (\ddot{A}_3 - \ddot{A}_1)$ | 0.928 | 0.831 | 3 |

[1]15 ultrasonic images of beef from University of Wisconsin. See APPENDIX A for more details.
$P_{tp}$ Percentage of total area filled with marbling fat particles in the l.d. muscle cross-sectional area.
$\ddot{A}_n$ Non-overlapped area between two normal curves for autocorrelation of order n, n = 1, 2, and 3.

It is interesting to notice that the regression of $P_{tp}$ on the difference in area between the first order $\ddot{A}_1$ and the second order $\ddot{A}_2$ (Regression equation 11 in Table 3), compared with the regression of $P_{tp}$ on $\ddot{A}_2$ (Regression equation 9 in Table 3), dramatically increases the correlation coefficient r from 0.574 to 0.832 and reduces the residual standard error (RSE) from 1.365 to 0.925. This might be explainable since, in theory, the ultrasound B-mode speckle noise is autocorrelated [Wagner et al., 1983; Flax et al., 1981; Burckhardt, 1978] whether or not the intramuscular fat particles exist; the presence of the fat particles enhances the effects of autocorrelation of speckle apparently by increasing the roughness of surface which scatters the ultrasonic wave and thereby making the phenomena of autocorrelated speckle noise even more complicated. One of the possible consequences appears to increase n, the order of autoregressive process.

The autoregressive coefficients $\phi_1, \phi_2, \ldots, \phi_n$ in the autoregression model of order n are estimated by the estimates of autocorrelations $\rho_1, \rho_2, \ldots, \rho_n$ from the experimental data. The estimate of $\phi_n$ is of particular importance, since if $\phi_n$ is close to zero it suggests that the model should have order less than n. It was found that in this group of images $\phi_3$ was 0.01 in average with variance 0.0024, which can be seen from Table 3 that the result of regression using n=3 does not appear superior to that using n=2 statistically. This indicates that n=2 may suffice for the similar kind of images as those described herein.

The complexity involved in calculating Ä make us think of an alternative, simple way to predict marbling. Since the model derived theoretically above for marbling finally has only autocorrelations involved and the regression technique is used in the last step, marbling score (MS or $P_{tp}$) could be directly regressed on the autocorrelations $\rho_1, \rho_2, \ldots, \rho_n$, or on the function of $\rho_1, \rho_2, \ldots, \rho_n$ such as $1/(1-\rho_1^2)$, $1/(1-\rho_2^2)$, $\ldots$, $1/(1-\rho_n^2)$ based on separate, first-order autoregressive processes. Some of the results are presented in Table 4.

It is noted that Regression equation 13, the regression of $P_{tp}$ on $1/(1-r_1^2)$ and $1/(1-r_2^2)$, apparently improves the accuracy of prediction and that Regression equation 16 is the simplest and the most straightforward one with the relative high correlation coefficient, which has seldom been seen in the literature.

TABLE 4

Regressions of marbling score (MS) or marbling fat area percentage ($P_{tp}$) on autocorrelations of order 1 and 2 for Beef Group 1.[1]

| No | Regression Equation | RSE | r |
|---|---|---|---|
| 13 | $P_{tp} = -10.69 - 8.01/(1 - r_1^2) + 16.84/(1 - r_2^2)$ | 0.732 | 0.907 |
| 14 | $P_{tp} = -3.12 - 23.46\, r_1^2 + 41.09\, r_2^2$ | 0.790 | 0.891 |
| 15 | $P_{tp} = -7.62 - 30.34\, r_1^2 + 48.50\, r_2$ | 0.830 | 0.878 |
| 16 | $MS = -3.16 - 19.74\, r_1 + 30.07\, r_2$ | 0.523 | 0.871 |

[1] 15 ultrasonic images of beef from University of Wisconsin. See APPENDIX A for more details.
$r_n$ The coefficient of correlation between a pixel and its nth neighboring pixel in the direction of ultrasonic wave propagation, where n = 1 and 2.

The results of applying the similar regression models as Equations 13 and 16 to another population (45 beef from University of Georgia, see Table 5) were not as reproducible. The best correlation coefficient was 0.454.

TABLE 5

Regressions of marbling score (MS) or marbling fat area percentage (IP$_{tp}$) on autocorrelations of order 1 and 2 for Beef Group 2.[1]

| No | Regression Equation[1] | RSE | r |
|---|---|---|---|
| 17 | $P_{tp} = -1.42 - 3.50/(1 - r_1^2) + 7.37/(1 - r_2^2)$ | 0.651 | 0.422 |
| 18 | $MS = -3.72 - 5.59\, r_1 + 4.86\, r_2$ | 0.388 | 0.454 |

[1] 45 ultrasonic images of beef from University of Georgia. See APPENDIX A for more details.

The significant difference in intercepts and slopes of Regression equations 17 and 18 and much lower r, compared with Regression equations 13 and 16, indicate that either the model is inconsistent or the applied samples are not representative. The latter reason may be hinted by the pattern of marbling score distributions of the two beef populations. Thirty-six out of 45 beef carcasses in the second group had marbling scores in the range of 2 to 3 and none below marbling score 1 and none above 4, much less evenly distributed than the beef carcasses from the first group, though the first group was only one-third of the size of second group. The coefficient of correlation is usually lower for a large set of data that are gathered at one point.

The size of the area of interest in the image for marbling assessment varies from $N = N_r \times N_c = 82 \times 82$ to $99 \times 105$ pixels, depending upon the relative size of the longissimus dorsi muscle of individual beef. It is usually thought that isolating the longissimus dorsi (l.d.) muscle from surrounding fat and other muscles not considered part of the l.d. is the first step necessary to take for marbling measurement. This is true for the photographic image of the standard marbling charts [Chen et al., 1989] or the image taken directly from the exposed ribeye of the l.d. muscle cross section, but it is not the case for the ultrasonic image. Since the beef ribeye anatomically has a notch at its top close to the back midline of the animal which consists of intense connective tissues in a variety of shapes, the ultrasonic wave is almost entirely reflected back or scattered in that area instead of penetrating further to the l.d. to form informative image. Consequently, the resulting image under that notch area appears dark or obscure, much like a shadow cast by a substandard umbrella. Because of this, it is inaccurate or biased to use the whole ribeye image for marbling. To avoid this problem, a maximum rectangular area within the l.d. image but laterally away from that notch and the back midline is specified as the area of interest to process for marbling. Working on a rectangular region is, for the sake of computation, much easier and more efficient than working on an irregular area, especially for image processing. This may create a new bias because only part of the l.d. is used. Hence, it would be safe to assume that the intramuscular fat particles in the specified area have the same distribution as the entire cross-sectional area of the longissimus dorsi muscle.

It is worth noting that the mean of image intensity $\mu$ is not at all involved in the computation of Ä. This is an important feature in application since the intensity of an image is affected by many factors. The overall, near field and far field intensity of display in ultrasonic equipment can be changed at will by the machine operator. The contact between the transducer and the animal skin, affected by such factors as the thickness of hair, the coupling fluid, and the pressure induced by the operator hand, influences the image intensity as well as the image quality. Therefore, it is not expected that the variation of marbling score can be explained by that of image intensity. As a matter of fact, the coefficient of correlation between MS and $\mu$ is 0.250 (P>0.05).

It is known that ultrasound speckle results from the coherent accumulation of random scattering from rough surfaces. The various scattered components from different directions interfere and the resulting speckle pattern may consist of a multitude of bright spots where there has been a highly constructive interference, dark spots where there has been a highly destructive interference, and gray levels in between these extremes [Goodman, 1976]. Therefore, the intramuscular fat particles do not necessarily appear bright in the ultrasonic image and the homogeneous part inside the marbling particles will probably not register it as speckle in the ultrasonic image. Furthermore, blood vessels and connective tissues are also scatterers of ultrasonic wave which may echo specular reflection or may register its image as speckle, depending upon their sizes, orientation and roughness of their surface. Hence, studying marbling from the ultrasonic image is a rather complicated process. This discussion has provided a few specific examples of ways to study marbling characteristics in the ultrasonic image with the teachings of the present invention. There are many combinations and applications of these teachings to investigate this subject.

The speckle noise in ultrasound B-mode images has been shown to be autocorrelated. The autocorrelations of neighboring pixels in ultrasonic images have been studied in the direction of ultrasonic wave travelling. The relationship between the overall variance and the white noise variance in the image has been theoretically derived through the analysis of autoregression model. Based on the Gaussian distribution, the non-overlapped area under the two distribution curves after standardization has been correlated with the actual area covered by intramuscular fat or marbling. This result has shown that using autocorrelations to study marbling in ultrasonic images is superior, in terms of residual standard error and correlation coefficient, to the other methods seen in the literature.

COMPUTER ANALYSIS OF ULTRASONIC IMAGES FOR DETECTING THE OUTLINE OF LONGISSIMUS DORSI MUSCLE IN TRANSVERSE SECTION

A simple way for computing the area of the l.d. muscle based on the coordinates of the muscle outline is taught herein. In this method, a different approach is taken by employing a modified version of the Brink's correlation as an optimal thresholding criterion for image segmentation and several other edge enhancement techniques to detect and locate the outline of the longissimus dorsi muscle from the ultrasonic images.

The new method uses image averaging and image shift and difference to enhance the outline of the muscle, adopts a modified version of the Brink's correlation criterion to detect the outline of interest, and introduces a simple but efficient method to compute the area enclosed in the detected outline. For verification, the developed algorithm was applied to two sets of ultrasonic images from beef and swine. The results of applying the algorithm to two sets of ultrasonic image from beef and swine showed that the correlations between computer estimated and manually traced areas were no less than 0.73. This method can be easily incorporated into an automated system for animal evaluation and grading.

The present invention teaches a method for detecting an outline of a muscle from an ultrasonic image of an animal or carcass. An input is provided of an ultrasonic scan image including the outline of the muscle of the animal or carcass comprising rows and columns of gray level pixel data. An averaged image is created by replacing the gray level data for each of the pixels with an average of neighboring pixel gray levels. A shift and difference image is created by: 1) creating a shifted image by shifting the averaged image vertically and horizontally, 2) creating a first resultant image by subtracting the shifted image from the averaged image, 3) creating a second resultant image by subtracting the averaged image from the shifted image, 4) combining the first and second resultant images to create the shift and difference image. A bilevel image is created by selecting a threshold for converting each gray level value of each pixel to one of two levels and using the threshold to convert the gray level values to bilevel values. An initial window of rows and columns of pixels within the bilevel image. Subwindows are defined within the initial window such that each of the subwindows includes a portion of the outline. The outline within each of the subwindows is detected by searching the subwindow for rows or columns containing a higher ratio of bilevel pixels than a selected threshold ratio specific to each subwindow or higher. The outline detections in each of the subwindows are combined to provide a representation of the muscle outline. An output is provided of the representation of the muscle outline corresponding to the image input. The method can include calculating an area within the outline representation and providing an output of the calculated area. The threshold for converting gray level values to bilevel values is selected at such a level that maximizes the correlation coefficient between the shift and difference image and the bilevel image.

An LDM Outline Searching Algorithm. An algorithm for searching the outline of the longissimus dorsi muscle (LDM) is described herein. An ultrasonic image is first averaged by n×n neighborhoods to reduce the noise contained in the image. The averaged image is shifted up n−1 pixels and left n−1 and then the shifted and averaged images are subtracted to obtain the absolute difference image as a measure of the slope of the brightness trend. The absolute difference image is searched to define a window for the l.d. muscle. The window is further divided into 3×3 sub-windows. A modified version of the Brink's correlation criterion is introduced and applied to each of the sub-windows for optimal threshold selections. The outline of the l.d. muscle is then searched based on the selected thresholds and the area enclosed in the outline is computed using the method given herein.

Neighborhood averaging. Neighborhood averaging is a straightforward spatial-domain technique for image smoothing. Given an N×N image A(r,c), the neighborhood averaging procedure is to replace A(r,c) with the average of a predefined neighborhood of (r,c). If a three by three kernel is defined the middle pixel within the kernel will be replaced by the average of pixels in the kernel and the procedure can be carried out by a convolution.

Since an ultrasonic image has a granular appearance (speckle noise) and other artifacts caused by the small but rough interfaces of the scanned tissue, neighborhood averaging should reduce and smooth out some or all of this noise and artifact effects. Edges with large variations in gray values, however, may be also blurred by neighborhood averaging. The degree of blurring effect is strongly proportional to the size (denoted by n×n) of the neighborhood used [Lindley, 1991]. Our experience with animal ultrasonic images reveals that the interfaces between and among fat, muscle and bone appear as white bands which have a width of no less than 3 pixels. Therefore, using a 3×3 convolution kernel (n=3) should retain the characteristics of the interfaces of interest and reduce the effect of speckle noise and artifacts.

The shift and difference edge enhancement. As the name implies, this step enhances image edges by shifting an image by m pixels and then subtracting the shifted image from the original, where m is the number of pixels to shift. The result of the subtraction is a measure of the slope of the brightness trend. In an area of constant gray values, the subtraction will yield a slope of zero. Zero slope results in black pixel values. In an area with large changes in brightness, the subtraction will yield a non-zero slope. Negative slope values, however, will occur with transitions from white to black. Because of the hardware limitation, negative slopes will result in zero gray values. Hence, subtraction needs to be performed twice in reverse orders: subtracting the shifted image from the original and subtracting the original from the shifted. The two resultant images are then added to produce the absolute difference image.

When this approach is used to enhance vertical edges, the image is shifted left m pixels. To enhance horizontal edges, the image is shifted up m pixels. To enhance both vertical and horizontal edges the image is first shifted left m pixels and then shifted up m pixels before the subtractions are performed.

This edge enhancement technique is illustrated in FIG. 5 with m=1. For more detail Lindley [1991] should be consulted. Note that borders of image A are wrapped around when shifted and that negative values are shown as zeros in resultant images C and D.

A simple convolution approach. The steps for image neighborhood averaging and the shift and difference edge enhancement can be combined to a simple step using a convolution kernel for efficient and parallel processing. Simple as the image shifting sounds, its implementation is somewhat complex. For this reason, instead of actually shifting the images around, a convolution will be used to obtain the same effect. This can be combined with the neighborhood averaging to form a single step. By analyzing ultrasonic images, it was found that objects to be detected in an ultrasonic image have widths of no less than 3 pixels, and that any one or two pixel wide lines and spots are noise. Based on these findings, the following 5×5 convolution kernels in FIG. 6 are proposed to obtain the same effect as the separate steps of neighborhood averaging by 3×3 kernel and the edge enhancement by shifting right 2 pixels and down 2 pixels are carried out.

Figure 11:
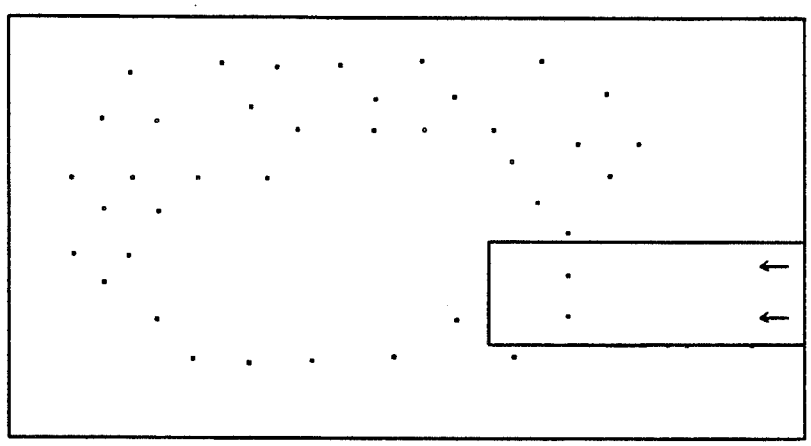
FIG. 11 is an illustration of a window for searching the right side of the longissimus dorsi muscle. The arrows represent searching directions.

The two convolved images by applying the 5×5 kernels given in FIG. 11 to an image are added and the resultant image is used for the l.d. muscle outline detection. The above preprocessing steps require that an axillary frame processor be present along with the image grabber board. The image convolution and addition are performed on a full frame image to take advantage of the high speed processing feature provided by the hardware.

A modified version of the Brink's correlation criterion for optimal thresholding. The Sliding Z-test algorithm discussed earlier is not suitable for detecting the outline of the l.d muscle since the region probabilities are unknown and hardly predictable. For this reason, the brink's correlation criterion [Brink, 1991] is introduced and modified for efficient operation. This technique is conceptually different from the sliding Z-test. It does not require the pre-specified region probabilities and it is independent of the original image distribution.

This thresholding method is an iteration approach, involving creating a final bilevel image by shifting and averaging a gray scale image or by using a convolution approach. Each pixel of the original image is assumed to belong to one of two classes representing 'black' and 'white' where T is the threshold level. The optimal threshold is selected at such a level that maximizes the correlation coefficient between the gray-scale image and the bilevel image. The correlation coefficient between the gray-scale and the bilevel images is computed as follows:

$$\rho_{xy}(T) = \frac{E_{xy}(T) - E_x E_y(T)}{\sqrt{\rho_x^2 \sigma_y^2(T)}}, \quad (42)$$

where $E_x$ and $\sigma^2_x$ are the expected mean and variance of the gray scale image, and $E_y(T)$ and $\sigma^2_y(T)$ the expected mean and variance of the bilevel image, respectively, and $E_{xy}(T)$ is the cross product between the gray scale and bilevel images. In general, it can be shown that regardless of the two values used in the bilevel image (subject to $d<w$, where d is the gray level for the dark class and w the gray level for the white class), the correlation coefficient will remain unchanged and will thus indicate the same threshold. Therefore, in implementing Equation 42, if $d=0$ and $w=1$ are used in the bilevel image and the gray levels of the original image are sorted and saved in a histogram bin array (h), then the bilevel image becomes the binary image and Equation 42 is simplified to the following, $$\rho_{xy}(T) = \frac{\sum_{i=T}^{m} i \cdot h_i - E_x \sum_{i=T}^{m} h_i}{\sigma_x \sqrt{N \sum_{i=T}^{m} h_i - \left(\sum_{i=T}^{m} h_i\right)^2}}, \quad (43)$$

where m is the maximum of gray levels in the original image.

In applying Equation 43 to the ultrasonic images, the range of searching for T is narrowed by assuming that T is no less than the mean of the original image, since the objects of interest are much smaller yet brighter than the background. Equation 43 could also be modified further by multiplying both sides of the equation by $\sigma_x$ and then taking the squares of the both sides, that is, $$\rho_{xy}^2(T)\sigma_x^2 = \frac{\left(\sum_{i=T}^{m} i \cdot h_i - E_x \sum_{i=T}^{m} h_i\right)^{2'}}{N \sum_{i=T}^{m} h_i - \left(\sum_{i=T}^{m} h_i\right)^2}, \quad T > E_x. \quad (44)$$

Thus the optimal threshold T for the original image will be selected at the level that is greater than the mean of the image and also maximizes Equation 44. This equation can be easily programmed in an iteration fashion and efficiently implemented.

The disclosed algorithm requires specification of the percentage of edge pixels (PEP) in a row for a vertical strip or in a column for a horizontal strip that have gray values greater than the optimal threshold (OT). This specification was based on some general characteristics of the ultrasonic image and by trial and error, since the OT detects not only the pixels on an interface of interest but also the pixels of white noise spots and the overall image intensities in the sub-windows are not uniform. In general, the top of an image is brighter than the bottom of the image, the vertical interfaces of an image is not as clear as the horizontal ones, and thus the clear and bright interfaces tend to be continuous and the noise and artifacts tend to be discontinuous. Therefore, the PEPs for the sub-windows at the top (MWS, MW1 and MW2) are higher than the other sub-windows. By trial and error on the processed images, the following values in Table 6 were selected for the sub-windows.

TABLE 6

| The percentages of edge pixels for the sub-windows of image. | | |
|---|---|---|
| Sub-Window | PEP for swine | PEP for beef |
| MW1 | 75 | 90 |
| MW2 | 75 | 75 |
| MW3 | 65 | 55 |
| MW4 | 55 | 55 |
| MW5 | 40 | 50 |
| MW6 | 40 | 50 |
| MW7 | 65 | 40 |
| MW8 | 75 | 75 |

These values were somewhat arbitrary but the detected outline was visually closer to the perceived outline of an image. This could be a disadvantage since for different sets of images other values might work better. Determining the appropriate numbers is a tedious and time-consuming process. On the other hand, this could be a distinct advantage since adjusting these values interactively enables the proposed algorithm to be controlled at the time of application and therefore to be effective for all image categories.

The teachings of the present invention draw a hypothetical ellipse to confine the l.d. muscle and the coordinates of the ellipse are assigned to the location where the modified version of the Brink's correlation criterion fails to find an obvious local maxima. This feature, with the smoothing technique, makes it possible to extract or approximate the outline even if some parts of the outline are lost or have very weak contrast, which is usually the case for such interfaces as the lateral and medial boundaries of the l.d. muscle that are parallel to the ultrasonic wave. Because of this, the outline detected by this algorithm is an approximation of the actual outline of the l.d. muscle.

The LDM outline searching steps. The modified version of the Brink's correlation (MBC) criterion for optimal thresholding discussed above is used on the preprocessed ultrasonic image to determine the window and detect the outline of the l.d. muscle. The window is further divided into 3×3 sub-windows and a hypothetical ellipse is drawn within the window. The outline of the l.d. muscle is believed to be confined within the ellipse and searched separately around the sub-windows within the boundary of the ellipse. If the MBC criterion fails to find an obvious local maxima, the coordinates of the ellipse are assigned to that place instead. The searching processes are performed as follows.

1. Defining the fat and muscle window: A window is first defined to be large enough to cover the entire view of fat and longissimus dorsi muscle (LDM) for fat and muscle area measurements in an ultrasonic image (FIG. 7). The default window has its origin at the 50th row and 80th column and its size of 320 rows and 288 columns, denoted by (R0, C0, RS, CS)=(50, 80, 320, 288) which is suitable, in all the cases, for both pork and beef ultrasonic images.

The window should be reduced to its appropriate values if the view for fat and muscle measurements is known to be smaller than the defaults.

2. Searching the top of the LDM (TOM): A window for searching the top of the LDM, i.e. the interface between the fat and l.d. muscle, is first defined at (R0, C0+CS/3, MFT, CS/3), where the MFT is short for maximum fat thickness that is by default 170 rows for pork and 120 rows for beef (FIG. 8) and then the MBC criterion is applied to the window to determine the optimal threshold (OT). The window is further divided into equally spaced, vertical strips, where the number of strips is 5 by default but can be changed as desired.

Each of the strips with MFT rows and CS/3/NOS columns is searched upwards by noting the place where a certain percentage of edge pixels (PEP) in a row have gray values greater than the OT. The row location of this place is saved along with its column position. The smallest of the NOS row locations is selected as the TOM. This step could be combined with fat thickness measurement for efficient operation.

Figure 9:
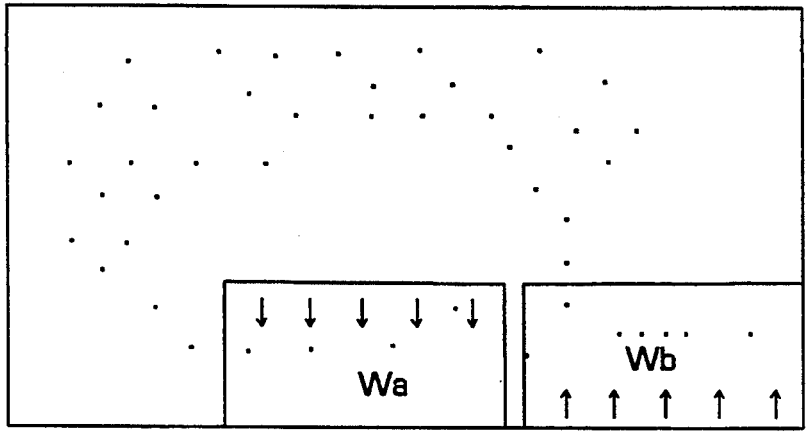
FIG. 9 is an illustration of windows for searching the bottom of the longissimus dorsi muscle. The arrows represent searching directions.

3. Searching the bottom of the LDM (BOM): The bottom of the l.d. muscle is searched by defining two windows (Wa and Wb): Wa at (TOM+2*(R0+RS—TOM)/3, C0+CS/3, PMD, CS/3) and Wb at (TOM+2*(R0+RS—TOM)/3, C0+2*CS/3, MMD, CS/3), where MMD stands for the maximum muscle depth that is the smaller value of 200 and R0+RS-TOM (FIG. 9). Each of Wa and Wb is sub-divided into strips in the same way as in step 2.

The strips in Wa are searched downwards and the strips in Wb are searched upwards. The first significant row locations from the strips are saved along with their column positions and the largest row location is used as the BOM.

Figure 10:
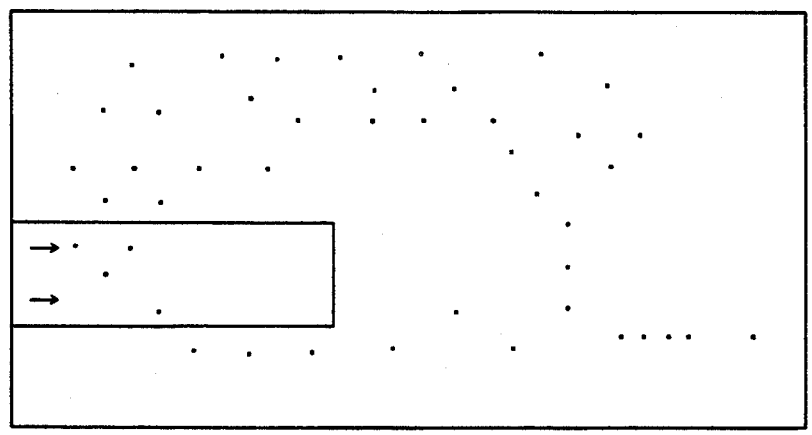
FIG. 10 is an illustration of a window for searching the left side of the longissimus dorsi muscle. The arrows represent searching directions.

4. Searching the left of the LDM (LOM): A window is defined at (TOM+(BOM—TOM)/3, C0, (BOM—TOM)/3, CS/3) and the operation of edge detection is performed in the same fashion as in step 2 except that the orientation of sub-divided strips is horizontal and the searching is done from left to right instead of from the bottom upwards for somewhat vertical interfaces (FIG. 10). The smallest of the significant column locations is selected as the LOM.

5. Searching the right of the LDM (ROM): A window is defined at (TOM+(BOM—TOM)/3, C0+2*CS/3, (BOM—TOM)/3, CS/3) and the operation of searching is carried out in the same way as step 4 (FIG. 11). The largest of the significant column locations is selected as the ROM.

6. Defining the LDM Window and sub-windows: The l.d. muscle window is defined at (TOM, LOM, BOM-TOM, ROM-LOM) based on the results from steps 2 to 5 and further divided into 3×3 equal-sized sub-windows (FIG. 12).

Of the 3×3 sub-windows the center sub-window is labeled as MW0, and the middle sub-window at the top is labeled as MW1 and the rest of the sub-windows are labeled clockwise as MW2 to MW8, respectively. A maximum ellipse is hypothetically drawn within the LDM window and the l.d. muscle is proposed to be confined in the ellipse.

7. Searching the four corners of the LDM: The four corner sub-windows (MW2, MW4, MW6, and MW8) defined in step 6 are divided into strips in a similar fashion as the other steps and searched from the boundary of the hypothetical ellipse inward for somewhat horizontal interfaces, since the l.d muscle has a greater width than depth in both beef and pork.

8. Smoothing the coordinates for the outline of LDM: The row and column locations detected in the sub-windows defined in step 6 are from the following steps:
Step 2 for MW1
Step 3 for MW5
Step 4 for MW7
Step 5 for MW3
Step 7 for MW2, MW4, MW6, and MW8.

The row and column locations in the 8 sub-windows (MW1 to MW8) are rearranged in such a way that the row and column locations are each saved in an array clockwise from MW1 to MW8 (see FIG. 12). The row and column locations are smoothed separately by running median of 3. The resulting values of these locations are used as the coordinates for the outline of the l.d. muscle.

9. Computing the area of the LDM: The coordinates from step 8 are used to compute the area of the l.d. muscle with the method presented in the following section. The conversion factors from pixels to the desired units (Table 7) are dependent upon the ultrasonic transducers and can be determined from the image screen since an ultrasonic image is displayed with horizontal scales at the top and vertical scales down the left.

TABLE 7

| Conversion factors from pixels to cm. | | |
|---|---|---|
| Transducer | 10 cm equivalent | |
| Model | rows | columns |
| UST-5011U-3.5MHz (12.7 cm wide) | 302 | 237 |
| UST-5044U-3.5MHz (17.2 cm wide) | 222 | 175 |

A simple method for computing the area of an irregular shape. The area enclosed in a region boundary coded with directed line segments can be computed in a simple way based on the concept of calculating the area of a triangle in a two-dimensional Cartesian system. It can be shown that the area of any plane triangle with vertices at $(x_1,y_1)$, $(x_2,y_2)$, and $(x_3,y_3)$ is $|D|/2$, where $$D = \begin{vmatrix} x_1 & y_1 & 1 \\ x_2 & y_2 & 1 \\ x_3 & y_3 & 1 \end{vmatrix} \quad (45)$$

$$= (x_2 - x_1)(y_3 - y_1) - (x_3 - x_1)(y_2 - y_1).$$

D is positive if the three points are in counterclockwise order, negative if the points are in clockwise order, and 0 if the points are collinear.

In our case, suppose that the row locations are saved in array y[n] and their corresponding column locations are saved in array x[n], where n represents the number of points on the outline of the l.d. region (see FIG. 13). The area enclosed in the directed coordinates is the summation given by Equation 46, that is, the area of a polygon of n vertices is equal to the sum of the areas of n−2 straight triangles with the common vertex at $(x_1,y_2)$ in the polygon.

$$\text{Area} = \frac{1}{2} \left| \sum_{i=2}^{n-1} [(x_i - x_1)(y_{i+1} - y_1) - (x_{i+1} - x_1)(y_i - y_1)] \right|. \quad (46)$$

This method is much more efficient than the way used by Berlow [1989b] who calculated the area by counting pixels.

Application

The present invention teaches a method for detecting an outline of a muscle from an ultrasonic image of an animal or carcass. An input is provided of an ultrasonic scan image including the outline of the muscle of the animal or carcass comprising rows and columns of gray level pixel data. An averaged image is created by replacing the gray level data for each of the pixels with an average of neighboring pixel gray levels. A shift and difference image is created by: 1) creating a shifted image by shifting the averaged image vertically and horizontally, 2) creating a first resultant image by subtracting the shifted image from the averaged image, 3) creating a second resultant image by subtracting the averaged image from the shifted image, 4) combining the first and second resultant images to create the shift and difference image. A bilevel image is created by selecting a threshold for converting each gray level value of each pixel to one of two levels and using the threshold to convert the gray level values to bilevel values. An initial window of rows and columns of pixels within the bilevel image. Subwindows are defined within the initial window such that each of the subwindows includes a portion of the outline. The outline within each of the subwindows is detected by searching the subwindow for rows or columns containing a higher ratio of bilevel pixels than a selected threshold ratio specific to each subwindow or higher. The outline detections in each of the subwindows are combined to provide a representation of the muscle outline. An output is provided of the representation of the muscle outline corresponding to the image input. The method can include calculating an area within the outline representation and providing an output of the calculated area. The threshold for converting gray level values to bilevel values is selected at such a level that maximizes the correlation coefficient between the shift and difference image and the bilevel image.

The longissimus dorsi muscle outline searching algorithm discussed above was applied to two sets of ultrasonic images, one from swine and one from beef (see APPENDIX A for more about the samples), acquired with the ultrasonic unit model SSD-500V [Aloka, 1990a] with 3.5 MHz transducers [Aloka, 1990a and 1990b]. Table 7 shows the results of comparison between the computer and manually traced area measurements.

TABLE 7

The results of comparisons among the computer, manual, and carcass l.d. muscle area measurements.[1]

| No | Regression Equation | RSE* | r** |
|---|---|---|---|
| | Hogs from University of Missouri: N = 125 | | |
| 19 | Manu. Area[A] = 6.90 + 0.86 Comp. Area[AA] | 2.812 | 0.834 |
| | Beef from UniVersity of Wisconsin: N = 15 | | |
| 20 | Carc. Area & = 2.32 + 0.97 Comp. Area | 5.335 | 0.836 |
| 21 | Carc. Area = −9.87 + 1.09 Manu. Area | 5.342 | 0.836 |

TABLE 7-continued

The results of comparisons among the computer, manual, and carcass l.d. muscle area measurements.[1]

| No | Regression Equation | RSE* | r** |
|---|---|---|---|
| 22 | Manu. Area = 29.68 + 0.65 Comp. Area | 5.090 | 0.731 |

[1] See APPENDIX A for more details about the samples.
*RSE: Residual standard Error, cm$^2$.
**r: Pearson correlation coefficient, dimensionless.
^Manu. Area: LDM area traced manually with a pointing device from the ultrasonic images, cm$^2$.
^^Comp. Area: LDM area estimated by the computer from the same ultrasonic images as used for Manu. Area, cm$^2$.
& Carc. Area: LDM area physically measured from the carcasses when the animals were slaughtered, cm$^2$.

The regression analysis indicated that the correlations among computer, carcass, and manually traced area measurements were no less than 0.73 and that the computer area measurement was as accurate as the manually traced area measurements.

This proposed method can be easily combined with other algorithms and models like the Sliding Z-test algorithm for fat measurement and the autoregression model for beef marbling to develop a complete and automated system for meat animal and carcass evaluation and grading, which can be seen from the procedure and strategy employed in the proposed algorithm. The step for detecting the top of the muscle can be done in fat measurement using the Sliding Z-test and the center region (MWO) of the sub-windows of the l.d. muscle can be used for marbling measurement. Although the convolution step in the proposed algorithm requires an axillary frame processor installed in a computer in addition to the image grabber board, the efficient and high speed processing feature of this hardware may justify its use in practice.

IMPLEMENTATION OF THE TEACHINGS OF THE PRESENT INVENTION WITHIN A REAL TIME SYSTEM

The teachings of the present invention are efficient enough to be implemented in a real time system. The transducer can be positioned manually or automatically on carcasses or animals and then the images can be processed fast enough to allow real time evaluation and sorting. This is extremely important in a practical application of the present invention. Meat processors or breeders will be able to use the present system to sort animals or carcasses based upon the information provided. Such efficient sorting can result in a more profitable processing of carcasses in that only the more valuable carcasses will be selected to go through the more expensive processing steps. Breeders can efficiently select stock for breeding or slaughter based upon the information provided by the present system. Some practical hints for designing a real time system are provided herein, however, it is expected that when each of the many applications of the teachings of the present invention are implemented further features can be added by the user of the system.

Image Verification. The system can be built in such a way that it can automatically make the decision as to whether or not there is a valid image, regardless of the existence of an animal or carcass identification on the image. Freezing and releasing an image does not alter the previous inputs to the surrounding area including the ID field. This decision must also be made fast enough for near real-time operation since all the input information will be lost during the decision making period. In addition it takes 1/30 second to digitize a full frame image before any decision can be made. Hence, the algorithm used for this purpose must be simple but efficient.

If the interval image between two animals or carcasses is black or very low in image intensity, compared with a normal ultrasonic image from a animal or carcass, then the image intensity can be used to verify whether or not there is a desired image. By analyzing the images, it was found that normal ultrasonic images had average gray values greater than 30, about 12% of the maximum intensity. Although the image intensity can be controlled by the machine operator, an image with intensity lower than 12% of the maximum is hardly visible. This is a very simple mechanism for image verification but either too low or too high a threshold selected may result in a loss of useful image.

Timing for automatic operation. The timing for triggering a measurement depends on both the software execution speed and the on site speed of a particular application. For instance, the chain speed of a large modern commercial abattoir can be as high as 1200 hogs or 400 beef per hour. This speed must be matched for practical application of an automated system in commercial slaughter houses. Suppose that one set of the automated system is used for hogs in a packing plant which operates at the chain speed of 1200 carcasses per hour, and that an operator or robot is able to correctly locate the ultrasonic transducer and to obtain a quality image from each hog carcass passed by. This means that, with the image source passes through the image grabber board, the system must be capable of digitizing an image and making all pre-specified measurements within 3 seconds for each hog (3600 seconds / 1200 hogs). Within this short period of time, the system first freezes and digitizes the image in the active input onboard memory buffer, and then identifies the image, makes the specified measurements, and finally outputs the results (to screen, file and/or printer). When all this is done, the system releases the image, sets the system back to image passthru mode, and is ready for the next cycle. Although digitizing a full frame image into the active on-board buffer takes only 1/30 second, releasing and freezing an image too frequently makes the memory of the active on-board buffer unstable. It was found that the accuracy of ID recognition was reduced to about 17% if a new image is frozen within one fifth of a second after releasing the last image. Therefore, it is recommended that the active on-board buffer be in passthru mode for at least 1/5 of a second before grabbing an image.

Table 9 contains the approximate time required for various processes. Slightly more than half of the processing time for an image is consumed by the 5×5 convolution required in muscle area measurement and the rest of the time is spent by the system software for fat detection and muscle outline searching. The exact time for some processes varies, depending upon the size of window specified and how difficult an object of interest is to be found.

TABLE 9

Approximate time required for various processes[1].

| Process | Time (mil-seconds) |
|---|---|
| Delay between images | 220.000 |
| Digitizing an image | 33.333 |
| Read ID | 27.473 |

TABLE 9-continued

Approximate time required for various processes[1].

| Process | Time (mil-seconds) |
| --- | --- |
| 5 × 5 Convolution | 1758.242 |
| Image addition | 77.962 |
| Fat measurement (SZT[2]) | 274.725 |
| Fat measurement (MBC[3]) | 109.890 |
| Muscle outline searching | 824.176 |
| Measurement smoothing | 0.000 |
| Area calculation | 0.000 |
| Output results and others | 27.473 |

[1]Tested on AST Premium/386C 20MHz computer with Intel 387 math coprocessor.
[2]The sliding Z-test algorithm
[3]The modified version of the Brink's correlation.

The expected time requirement will be dramatically reduced if a higher speed computer (such as an IBM 486 with 33 MHz or higher) is used instead of the 386/20 MHz. If the speed can not match a particular application of the automated system in practice, two or more sets of the system could be considered. Doing this, however, may induce new problems and complexities.

Smoothing techniques for multiple measurements. The smoothing techniques to be introduced here are not for smoothing images but for smoothing multiple measurements. They are used only for diminishing extreme observation or outlier effects that may be present in multiple measurements as a result of a poor sampling or location specification. Since an ultrasonic image is noisy and an animal tissue is non-homogenous, any connective tissue or a fat particle that is close to or greater than the size specified for a spatial-domain neighborhood averaging may be detected as an edge. If this happens, the measurement made may be incorrect. A single measurement or two may suffer from this occurrence. However, more than two measurements may enable us to separate an outlier from the others by some smoothing techniques. An outlier, on the other hand, may be indeed very important and contain some useful information but it has nothing to do with a smooth curve. Whether or not it is an error, we do not want it to disturb the rest of data. In this section two neighborhood smoothing techniques are introduced.

Running medians of k. Suppose that there are n equally-spaced measurements denoted by $m_1, m_2, \ldots, m_i, \ldots, m_n$ and k is the specified size of neighborhood, $m_i$ will be replaced by the median of measurements from $m_{i-k}$ to $m_{i+k/2}$, where i is from $1+k/2$ to $n-k/2$. The two ends of the measurements remain unchanged.

Running averages of k. This smoothing technique is similar to the running median of k except that the average of measurements from $m_{i-k/2}$ to $m_{i+k/2}$ is used instead of their median.

The running medians method is very effective in eliminating the sparse, extreme measurements which may be caused by the image noise and artifacts. However, the extreme measurements have a great influence on the final results if the running averages is used. Because of this, the running medians is preferred and used in muscle area measurement and no comparison is made between the two smoothing techniques.

System overall designing philosophy. The system has been designed with both flexibility and reusability in mind. The parameters of the algorithms and methodologies described above are declared as variables rather than constants. Although the computer execution speed is always a little faster with constants than variables, it is impossible to find a set of fixed values to meet all circumstances encountered in the real world. However, it is possible only to use variables as run time options so that they can be altered, if desired, to meet requirements of a particular application. This not only makes the system flexible for use on beef and hogs in various situations in practice but also provides the system user with opportunities to explore for other applications because the similarity of the tissues in the area of evaluation exists across all species. All these features enable the current system to be improved or reused in the future.

APPENDICES

The attached appendices are included as examples of practical embodiments of some of the teaching of the present invention. Appendix A is description of the data from the populations used for verification of the teachings of the present invention. The following appendices are examples of source code (programmed in C) for practicing some of the methods of the present invention.

APPENDIX A

Descriptive statistics of beef and swine data

| Sample[1] | Measurement[2] | N | Mean | SD | Min | Max |
|---|---|---|---|---|---|---|
| 1 | Fat Thickness | 125 | | | | |
|  | Manual |  | 3.15 | 0.84 | 1.40 | 5.33 |
|  | Computer(SZT) |  | 2.90 | 0.76 | 1.32 | 4.90 |
|  | Computer(MBC) |  | 2.77 | 0.89 | 0.31 | 4.83 |
|  | Muscle Area | 125 | | | | |
|  | Manual |  | 43.6 | 5.01 | 31.7 | 58.2 |
|  | Computer |  | 42.6 | 4.90 | 33.2 | 58.4 |
| 2 | Fat Thickness | 95 | | | | |
|  | Carcass |  | 2.62 | 0.81 | 1.14 | 6.35 |
|  | Manual |  | 2.49 | 0.81 | 1.27 | 6.35 |
|  | Computer(SZT) |  | 2.59 | 0.76 | 1.07 | 4.80 |
| 3 | Fat Thickness | 15 | | | | |
|  | Carcass |  | 1.14 | 0.58 | 0.25 | 2.16 |
|  | Manual |  | 0.91 | 0.38 | 0.28 | 1.60 |
|  | Computer(SZT) |  | 1.54 | 0.39 | 0.99 | 2.16 |
|  | Computer(MBC) |  | 1.19 | 0.41 | 0.58 | 2.03 |
|  | Muscle Area | 15 | | | | |
|  | Carcass |  | 77.3 | 9.03 | 62.6 | 95.5 |
|  | Manual |  | 79.8 | 6.97 | 66.9 | 91.4 |
|  | Computer |  | 77.6 | 7.87 | 61.9 | 91.2 |
|  | Marbling Score | 15 | | | | |
|  | Carcass |  | 2.32 | 0.95 | 0.80 | 4.00 |
|  | Manual |  | 2.80 | 0.83 | 2.00 | 5.00 |
|  | Computer(Eq16) |  | 2.32 | 0.83 | 1.05 | 3.98 |
| 4 | Marbling Score | 45 | | | | |
|  | Carcass |  | 2.49 | 0.42 | 1.40 | 3.70 |
|  | Computer(Eq18) |  | 2.49 | 0.19 | 1.96 | 2.88 |

[1] Sample 1: Swine data from University of Missouri
     2: Swine data from Hormel
     3: Beef data from University of Wisconsin
     4: Beef data from University of Georgia

[2] Carcass: Physical carcass measurement.
Manual: Manual measurement made from ultrasonic images.
Computer: Computer measurement made from ultrasonic images.
All measurements were made on the rib cross section between the 10/11th ribs for swine and the 12/13th ribs for beef. Fat thickness was made at the 3/4 position. Computer MS were estimated by Equations 16 and 18.

APPENDIX B

Edge detection algorithms for linear measurements

```
/**********************************************************
******* DETEDGES.C: Edge detection algorithms  ********
***********************************************************
*
* Three algorithms are used in this subroutine:
*
*    Optimal thresholding,
*    Sliding Z-test,
*    The modified version of the Brink's correlation.
*
* Edges are detected based on the information given in the
* structure pointed by:
*
*    EDGE_DETECT_STRUCT *T
*
* The detected horizontal edge row locations, when T->hv
* is zero, or vertical edge column locations, when T->hv
* is anything other than zero, are saved in the array
* pointed by
*    short *result
* The number of edges found is saved in m, a local integer.
* The subroutine returns m, the number of edges found.
**********************************************************/
/*****************EDGE_DETECT_STRUCT********************/
/***********************************************************
*EDGE_DETECT_STRUCT should be included in a global header*
***********************************************************/ typedef struct edge_detect_struct
{
unsigned short
        rs,      /* size in rows for each measurement */
        cs,      /* size in cols for each measurement
        t : 8,   /* threshold: 0..255 */
        tflag : 4,/* threshold flag
                * 0=compute t for the algorithm selected,
                * 1=compute avg and std for t,
                * 2=avg and std are given for t, and
                * 3=compute corr for t
                  (variance saved in corr[0]),
                * 4=corr's are given in *corr for t,
                * 5=t is given,
                * 6..15 undefined.
                * Note 3 and 4 for Z-test only.
                */
        method:4, /* method or algorithm to use for edge
                * detection
                *    0=optimal threshold (OT)
                *    1=sliding z-test (SZT)
                *    2=modified Brink's Correlation
                *    3..15 undefined.
                */
        edge : 4, /* edge to search
                *    0=none to detect
                *    1=top edges only;
                *    2=bottom edges only;
                *    3=both top and bottom edges
                *    4=all edges from top to bottom;
                *    5..15 undefined
                */
        hv : 4,   /* edge orientation
```

```
                         *      0=horizontal edge
                         *      1=vertical edge
                         *      2..15 undefined.
                         */
       n : 8,    /* number of neighboring pixels to average
                          * over
                          */
       step,     /* use one pixel every step pixels */
       p3,       /* prob of bright pixels in bright regions
                          * in nr*nc.
                          *
                          * note it is an integer (i.e. prob*100)
                          */
       *a;       /* two-dim data source array of size rs*cs
                          * must dynamically allocate memory for *a
                          * before used.
                          */
  double
       avg,      /* average of gray levels in rs*cs */
       std,      /* s.d.    of gray levels in rs*cs */
       p2,       /* probability of bright regions in rs*cs */
       Z1,       /* normal deviates from µ of dark regions in
                          * rs*cs.
                          */
       Zo,       /* overall normal deviates */
       *corr;    /* one-dim array of size 2*nr for
                          * correlations.
                          * must dynamically allocate memory for *corr.
                          * for Z-test only.
                          */
  }
  EDGE_DETECT_STRUCT;
  /*****************end of EDGE_DETECT_STRUCT***************/

/*******************DETEDGES.C*********************/ short detectedges(EDGE_DETECT_STRUCT *T, short *result)
  {
   /* for temporary uses */
   register short i, j, n, k, m=0;

/* return if no edge is wanted to detect */
   if (!T->edge) goto end;

/* select algorithms and find the optimal threshold */
   if (T->method==1)
        {
         /* sliding Z-test */
         m=sz_test(T, result);
         goto end;
        }

/* find threshold if it is not given */
   if (T->tflag!=5)
       {
        /* the optimal thresholding */
        if (T->method==0)
           {
            if (!T->tflag)
                T->Zo=optimalz(T->p2, T->Z1);

if (T->tflag<2)
                stats2(T->a, T->rs*T->cs, &T->avg, &T->std);

T->t=T->avg+T->Zo*T->std;
           }
        /* the modified version of Brink's correlation */
```

```
           else if (T->method==2)
              T->t=mbrinkt(T->a, T->rs*T->cs);
           /* new algorithms can be added here */
           else goto end;
 5    /* search for horizontal edges */
      if (!T->hv)
         {
          /* Find all the edges from top to bottom if edge==4 and
           * the top edge if edge==1 or 3
10        */
          if (T->edge!=2)
            {/* search from the top down
              * begin with the first T->n-1 rows
              * for efficient computation:
15            * each row has T->cs/T->step cols checked
              * k is the points with pixel_val>T->t in the each row
              * and saved in T->a[i*T->cs].
              * n is here the points with pixel_val>T->t in the
              * first T->n-1 rows.
20            */
             for (n=0, i=0; i<T->n-1; n+=(T->a[i*T->cs]=k), i++)
                 for (k=0, j=0; j<T->cs; j+=T->step)
                     k+=(T->a[i*T->cs+j]>T->t);
             /* find the place where the number of points with
25            * pixel_val>T->t is greater than T->p3.
              * continue search from the ith [e.i. (T->n-1)th row]
              * row down and add the current row k to n.
              * if n is greater than the number of points specified
              * (T->p3), it is an edge.
30            * break if only top edge needed.
              * if all edges are to find, subtract the last T->nth
              * k from n and continue.
              * n is the points with pixel_val>T->t in T->n rows.
              */
35
             for (; i<T->rs; i++)
                 {for (k=0, j=0; j<T->cs; j+=T->step)
                     k+=(T->a[i*T->cs+j]>T->t);
                  if ((n+=k)>T->p3)
40                   if (result[m++]=i-(T->n>>1), T->edge<4) break;
                  T->a[i*T->cs]=k;
                  n-=T->a[(i-T->n+1)*T->cs];
                 }
            }
45    /* Find the bottom edge if edge==2 or 3 */
          if (T->edge==2 || T->edge==3)
            {
             /* search from the bottom up */
50           for (n=0, i=T->rs-1; i>T->rs-T->n;
                    n+=(T->a[i*T->cs]=k), i--)
                for (k=0, j=0; j<T->cs; j+=T->step)
                    k+=(T->a[i*T->cs+j]>T->t);
             for (; i>=0; i--)
                {for (k=0, j=0; j<T->cs; j+=T->step)
55                   k+=(T->a[i*T->cs+j]>T->t);
                 if ((n+=k)>T->p3)
                    {result[m++]=i+(T->n>>1); break;}
                 T->a[i*T->cs]=k;
                 n-=T->a[(i+T->n-1)*T->cs];
60              }
            }
         }

/* search for vertical edges */
65    else
         {/* Find all the edges from left to right if edge==4 and
           * only the left edge if edge==1 or 3
```

```
                */
                if (T->edge!=2)
                {
                  /* search from left to right */
                  for (n=0, i=0; i<T->n-1; n+=(T->a[i]=k), i++)
                      for (k=0, j=0; j<T->rs; j+=T->step)
                          k+=(T->a[i+j*T->cs]>T->t);
                  for (; i<T->cs; i++)
                      {for (k=0, j=0; j<T->rs; j+=T->step)
                          k+=(T->a[i+j*T->cs]>T->t);
                       if ((n+=k)>T->p3)
                          if (result[m++]=i-(T->n>>1), T->edge<4)
                             break;
                       T->a[i]=k;
                       n-=T->a[i-T->n+1];
                      }
                 }
                /* Find the right edge if edge==2 or edge==3 */
                if (T->edge==2 || T->edge==3)
                {
                  /* search from right to left */
                  for (n=0, i=T->cs-1; i>T->cs-T->n;
                          n+=(T->a[i]=k), i--)
                      for (k=0, j=0; j<T->rs; j+=T->step)
                          k+=(T->a[i+j*T->cs]>T->t);
                  for (; i>=0; i--)
                      {for (k=0, j=0; j<T->rs; j+=T->step)
                          k+=(T->a[i+j*T->cs]>T->t);
                       if ((n+=k)>T->p3)
                          {result[m++]=i+(T->n>>1); break;}
                       T->a[i]=k;
                       n-=T->a[i+T->n-1];
                      }
                 }
            }
            /* return the number of edges found */
            end:
            return m;
        }
/***************end of DETEEDGE.C***********************/

/*******************SZ_TEST.C**********************/ include <stdlib.h> short sz_test(EDGE_DETECT_STRUCT *T, short *result)
{
    register short i, j,  /* for temperory use       */
                   m=0,   /* number of edges found   */
                   d;     /* the difference of Σx-Σy */

/* change 2d to 1d if cs>1 */
    if (T->cs>1)
        d2tod1(T->a, T->rs, T->cs, T->step, T->hv, T->a);

/* Compute the threshold if not given */
    if (T->tflag!=5)
        if (!ztest_t(T)) return 0;

/* Find all the edges from left to right if edge==4 and
     * only the left edge if edge==1 or 3
     */
    if (T->edge!=2)
    {
        /* Efficient sliding Z_test, independent of n */
        for (d=i=0; i<T->n; i++)
            d+=T->a[i] - T->a[i+T->n];
```

```
        d-=(T->a[i]<<1) - T->a[i-T->n] - T->a[i+T->n];

/* Loop over the middle N-2n points.
      * NOTE: Edges located on the first and last n pixels
      * can't be detected.
      */
     for ( ; i<T->rs-T->n-1; i++)
      /* Thresholding step: Discard all d ≤ T->t and check
       * only d > T->t */
       if (T->a[i] > T->avg &&
           abs(d+=(T->a[i]<<1) - T->a[i-T->n] - T->a[i+T->n])
           > T->t)
          /* Non-maxima suppression step:
           * current d > next d
           */
          if (abs(d) > abs(j=d + (T->a[++i]<<1) -
              T->a[i-T->n] - T->a[i+T->n]))
             /* Edge is the edge of bright region.
              * Break if only top edge is needed
              */
             {if (result[m++]=i-(d>0), d=j, T->edge<4)
                break;
             }
          /* Put i back since next d may be an edge */
          else --i;
      }
  /* Find the bottom edge if edge==2 or edge==3 */
  if (T->edge==2 || T->edge==3)
     {for (d=0, i=T->rs-1; i>=T->rs-T->n; i--)
         d+=T->a[i] - T->a[i-T->n];
      d-=(T->a[i]<<1) - T->a[i-T->n] - T->a[i+T->n];
      for ( ; i>T->n; i--)
         if (T->a[i] > T->avg &&
             abs(d+=(T->a[i]<<1) - T->a[i-T->n] -
             T->a[i+T->n]) > T->t)
          if (abs(d) > abs(j=d+(T->a[--i]<<1) -
              T->a[i-T->n]-T->a[i+T->n]))
             {result[m++]=i+(d>0);
              break;
             }
          else ++i;
     }
  /* The function returns the number of edges found */
  return m;
}
/***************end of SZ_TEST.C***********************/

/********************OPTIMALZ.C************************/

/* OPTIMALZ.C: Optimal normal standard deviates (Z)
 *      calculation based on assumptions that
 *          .two dark and bright regions are normally
 *           distributed.
 *          .the two regions have a common variance σ.
 *          .thresholding value is the value of Z1 standard
 *           deviation greater than the mean of the dark
 *           regions.
 *      p2, the probability of a point in the bright area of
 *           the window defined.
 *      Z1, the specified standard normal deviates.
 *      See reference for details.
 *      The function computes the double floating value Zo,
 *           which is for computing the optimal thresholding
 *           value T using formula: T=μo + Zo·σo
 *               where μo is the overall mean and
 *                    σo is the overall std of the defined
 *                          window.
```

```
 * This function return Zo in double float type.
 */ include <math.h>
double optimalz(double p2, double Z1)
{double Zo;
 /* μo-μ1=Cσ. C=p2(Z1+√(Z1²+2ln(p2/p1))). σ=σo/k.
  * k=√(1+C²p1/p2).
  * T=μ1+Z1σ=(μo-Cσ)+Z1(σo/k)
  *   =μo+σo(Z1-C)/k
  *   =μo+Zoσo
  * Zo=(Z1-C)/k
  */
 Zo=p2*(Z1+sqrt(Z1*Z1+2.0*log(p2/(1.0-p2))));
 Zo=(Z1-Zo)/sqrt(1.0+Zo*Zo*(1.0-p2)/p2);
 return Zo;
}
/***************end of OPTIMALZ.C***********************/

/*********************SZTEST_T.C***********************/

/* SZTEST_T.C:   Sliding Z-test threshold for Σx(i)-Σy(n+i),
 *               i=0, 1, ..., n-1.
 *               The threshold is saved in T->t,
 *               Neighborhood correlations are saved in
 *               T->corr with T->corr[0]=variance, and
 *               Standard deviation is saved in T->std.
 * This function returns the threshold
 *               T->t for Σx(i)-Σy(n+i).
 */ include <math.h>
short ztest_t(EDGE_DETECT_STRUCT *T)
{register short i;
 register double cf;
 if (T->tflag!=4)
     {
     /* compute correlations between 2n neighboring pixels
      * in array T->a
      */
     if (!(T->avg=onedcorr(T->a, T->rs, T->corr, T->n<<1)))
         return (T->t=0);
     /* compute the std of a pixel in T->a */
     T->std=sqrt(T->corr[0]);
     /* Compute the estimated ratio of σ[Σx/n-Σy/n] to
      * T->std, and
      * save it in *T->corr, that is, T->corr[0].
      */
     for (T->corr[0]=T->n*T->corr[T->n], cf=T->n, i=1;
         i<T->n-1; i++)
         {T->corr[0]+=T->corr[i]*i+T->corr[T->n+i]*(T->n-i);
          cf+=T->corr[i]*(T->n-i)*2;
         }
     if (T->corr[0]>=cf)
         T->corr[0]=0;
     else
         T->corr[0]
            =sqrt(2.0*(1.0-T->corr[0]/cf)   /* r(Σx/n,Σy/n) */
                *cf/(T->n*T->n)             /* σ²[Σx/n]/σ²  */
                /(1.0+T->p2*(1.0-T->p2)     /* σ²/σ²o       */
                *pow(sqrt(T->Zo*T->Zo +
                    2.0*log(T->p2/(1.0-T->p2)))+T->Zo,2)
                )
             );
     }
 else
```

```
/* Compute the std of a pixel in *T->a of size T->rs */
if (T->tflag!=2)
   {
    for (T->std=cf=i=0; i<T->rs; i++)
        {T->std+=(double)T->a[i]*T->a[i]; cf+=T->a[i];}
    if ((cf=T->std-cf*(T->avg=cf/T->rs))>0)
     T->std=sqrt(cf/T->rs);
    else T->std=0;
   }
/* The significant thresholding value for Σx-Σy:
 *      T=T->std*T->corr[0]*T->Zo*n;
 * This comes from the following:
 *      It is an edge if
 *          (Σx/n-Σy/n)/(T->corr[0]*T->std) > T->Zo.
 *      Recall that T->corr[0]*T->std is the estimate of
 *          σ[Σx/n-Σy/n].
 * This is equivalent to say that
 *      It is an edge if Σx-Σy > T->std*T->corr[0]*T->Zo*n.
 */
T->t=T->std*T->corr[0]*T->Zo*T->n;
return (T->t);
}

/*********************D2TOD1.C*************************/
/* D2TOD1.C:  Change two-dim array *a to one-dim array *d
 *            values read from *a every inc rows or cols.
 *
 *            if (!hv), then the average over cols saved in
 *                 d[0..rs-1];
 *            if (hv),  then the average over rows saved in
 *                 d[0..cs-1];
 */
short *d2tod1(short *a, short rs, short cs, short inc,
              short hv, short *d)
{register short r, c, n;
 register long t;

/* increment must be > 0 and < array dim */
 if (!inc || !hv && inc>cs || hv && inc>rs) inc=1;
 if (!hv)
    /* average over cols */
    for (n=cs/inc, r=0; r<rs; r++)
       {for (t=c=0; c<cs; c+=inc)
           t+=a[r*cs+c];
        d[r]=t/n;
       }
 else
    /* average over rows */
    for (n=rs/inc, c=0; c<cs; c++)
       {for (t=r=0; r<rs; r+=inc)
           t+=a[r*cs+c];
        d[c]=t/n;
       }
 return d;
}
/***************end of D2TOD1.C*************************/

/*********************MBRINKT.C*************************/

/* MBRINKT.C:  Compute the optimal threshold T with the
 *     modified version of the Brink's correlation.
 *     T is selected at the level above mean that maximizes
 *          the correlation between the gray-level image and
 *          the bilevel image, which is equivalent to maximize
 *          the following equation when bilevel image becomes
 *          binary (0 if GV<T, 1 if GV>=T)
 *
```

```
 *           r²(T)σ²x=[Σi*h(i) - μxΣh(i)]² / [NΣh(i) - Σ²h(i)]
 *
 *         where i=T...max; T=avg...max; avg=mean,
 *                max=maximum GV of *a;
 *                h(i)=bin[i] is the ith bin of bin array of
 *                      array *a;
 *                N is the size of the array *a.
 *
 * The function returns the thresholding value.
 */ short mbrinkt(short *a, short N)
{register short i, j, min, max, T=0;
 long bin[256];
 double total=0.0, cx, r, R=0.0, avg;
 /* build bins from *a */
 for (i=0; i<256; i++) bin[i]=0L;
 for (i=0; i<N; i++) ++bin[*a++];
 /* find the mean, min, and max of *a from bin */
 i=-1; while (!bin[++i]) ; min=i;
 i=256; while (!bin[--i]) ; max=i;
 for (i=min; i<=max; i++)
     total+=bin[i]*i;
 avg=total/N;
 /* redefine total to the total points that are ≥ avg and
  * find cross product cx
  */
 for (cx=total=0.0, i=avg+1; i<=max; i++)
     {total+=bin[i]; cx+=bin[i]*i;}
 /* find T */
 for (i=avg+1; i<=max; cx-=bin[i]*i, total-=bin[i], i++)
     {r=(cx-total*avg); r=r*r/(total*N-total*total);
      if (r>=R) {R=r; T=i;}
     }
 return T;
}
/***************end of MBRINKT.C************************/

/*********************STATS2.C*************************/
/* STATS2.C: Compute the mean and SD of short integer array
 *                arr[0..n-1] and save them in *avg and *sd,
 *                respectively.
 * The function returns the sum of the mean adn std.
 */ include <math.h> double stats2(short *arr, short n, double *avg, double *sd)
{register short i;
 double m,s;

for (*avg=arr[0], *sd=m=s=0.0, i=0; i<n; i++)
     {m+=(double)arr[i]*arr[i]; s+=arr[i];} if (n>1) *sd=sqrt((m-s*(*avg=s/n))/(n-1));

return *avg+(*sd);
}
/***************end of STATS2.C************************/

/*********************ONEDCORR.C***********************/
/* ONEDCORR.C: Compute autocorrelations of neighborhood of
 *                order m-1 from a one-dimensional short array,
 *                *a, of size n, and save the coefficients of
 *                correlation in a double float array, *corr,
 *                of size m. Since the correlation of corr[0]
 *                is always 1 (with itself), the variance of
```

```
*                   array *a is saved in corr[0] instead.
*                   The function won't check array boundaries
*                   and values passed.
*
* The function returns the mean of array *a in double float
*/ include <math.h>
include <string.h>
include <memory.h> double onedcorr(short *a, short n, double *corr, short m)
{
  register unsigned short i, j;
  double avg;

/* compute the cross products and overall sum */
  memset(corr, 0, sizeof(double)*m);
  for (avg=i=0; i<n; i++)
      for (avg+=a[i], j=0; j<m && j+i<n; j++)
          corr[j]+=(double)a[i]*a[i+j];

/* Calculate the common mean and variance for correlations
   *   avg=ΣX/n
   *   var=ΣX²/n - (ΣX/n)²
   *      =ΣX²/n - avg*avg
   * corr=(ΣXY/(n-i) - (ΣX/n)²)/((ΣX²/n - (ΣX/n)²)
   *     =(ΣXY/(n-i) - avg*avg)/var
   *    i=1, 2,..., m-1
   *
   * X and Y are assumed from the same population
   */

/* compute the mean */
  avg/=n;

/* compute the variance */
  corr[0]=corr[0]/n-avg*avg;

/* Compute the correlations
   * This method is an approximation so that some correlations
   * may be < -1 or > 1. If so, set it equal to -1 or 1
   * accordingly.
   */
  if ((short)(corr[0]*1000))
      for (i=1; i<m; i++)
         if (corr[i]=(corr[i]/(n-i)-avg*avg)/corr[0], corr[i]>1)
             corr[i]=1;
         else if (corr[i]<-1)
             corr[i]=-1;

return avg;
}
/***************one of ONEDCORR.C*********************/
```

APPENDIX C

Algorithm for LDM outline-like edge detection

```c
/**********************LDMEDGE.C************************/
/* LDMEDGE.C: Longissimus Dorsi Muscle outline-like Edge
 *     Detection using the modified version of the Brink's
 *     correlation as optimal thresholding criterion.
 *     The l.d. muscle is divided into 3x3 subwindows,
 *
```

| mw8 | mw1 | mw2 |
|-----|-----|-----|
| mw7 | mw0 | mw3 |
| mw6 | mw5 | mw4 |

```c
 *     mwx=0, 1, ..., 8 for the subwindows.
 *     w[0..3] for the subwindow coordinates
 *     arr points to the subwindow image.
 *     [w4..7] for the outside window of the whole l.d muscle
 *     for drawing ellipse around.
 *     nos for the number of strips (measurements)
 *     pbp for the probability*100 of a bright pixel in a row
 *     or columns, depending on the search direction.
 *     hv for edge orientation: 0=H 1=Vertical.
 *     tb for searching direction: 0 for top-bot/left-right
 *                                 1 for bot-top/right-left
 *     reverse for reversing the order of results saved in
 *     y for row location and
 *     x for column location.
 *     If not edge found, the ellipse coordinates are used.
 */
#include <string.h>
include <memory.h> void ldmedge(short *arr, short *w, short nos, short mwx,
             short pbp, short hv, short tb, short reverse,
             short *y, short *x)
{
  register short i, j, k, t, inc;
  short n[512], sl[512], *s2;
  static short T=-1;

/* increment as the width of each of the strips */
  inc=(!hv)? w[3]/nos : w[2]/nos;

/* find the number of pixels in inc pixels
   *      that are greater than T.
   * pbp must be > 0.
   */
  if (t=pbp=inc*pbp/100, !pbp) t=pbp=1;

/* Find the optimal threshold using the modified Brinks'
   * correlation
   */
  T=mbrinkt(arr, w[2]*w[3]);

/* Set the searching start location sl and length s2
   * for each of the strips
   */
  s2=&sl[256];
  for (i=0; i<nos; i++)
     if (!hv)
     {/* ellipse row location */
      y[i]=ellipser(&w[4], x[i]=w[1]+i*inc+(inc>>1));
      if (mwx==8 || mwx==1 || mwx==2)
         {sl[i]=w[4]+w[6]-y[i]-1;
```

```
                s2[i]=w[2];
                y[i]=w[0]+s1[i];
                }
            else
                {s1[i]=0;
                s2[i]=w[2]-(w[4]+w[6]-y[i]-1);
                }
            }
        else
            {/* ellipse column location */
            x[i]=ellipsec(&w[4], y[i]=w[0]+i*inc+(inc>>1));
            if (mwx>5)
                {s1[i]=w[5]+w[7]-x[i];
                s2[i]=w[3];
                x[i]=w[1]+s1[i];
                }
            else
                {s1[i]=0;
                s2[i]=w[3]-(w[5]+w[7]-x[i]-1);
                }
            }
        /* searching for the place where pbp pixels in a row or col
         * have gray values > T in each strip
         * if the place is not found, pbp decrements and continues
         * the searching.
         */
        if (!hv)
            {
            /* horizontal edge */
            for (i=0; i<nos; i++)
                if (memset(n, 0, w[2]<<1),
                    x[i]=w[1]+i*inc+(inc>>1), !tb)
                /* searching from top to bottom */
                for (t=pbp, j=s2[i]; j>=s2[i] && t>0; --t)
                    for (j=s1[i]; j<s2[i]; j++)
                        {for (k=0; t==pbp && k<inc; k++)
                            n[j]+=(arr[j*w[3]+i*inc+k]>T);
                        if (n[j]>=t)
                            {y[i]=w[0]+j;
                            break;
                            }
                        }
                else
                /* searching from bottom up */
                for (t=pbp, j=s1[i]-1; j<s1[i] && t>0; --t)
                    for (j=s2[i]-1; j>=s1[i]; j--)
                        {for (k=0; t==pbp && k<inc; k++)
                            n[j]+=(arr[j*w[3]+i*inc+k]>T);
                        if (n[j]>=t)
                            {y[i]=w[0]+j;
                            break;
                            }
                        }
            }
        else
            /* vertical edge */
            {for (i=0; i<nos; i++)
                if (memset(n, 0, w[3]<<1),
                    y[i]=w[0]+i*inc+(inc>>1), !tb)
                /* searching from left to right */
                for (t=pbp, j=s2[i]; j>=s2[i] && t>0; --t)
                    for (j=s1[i]; j<s2[i]; j++)
                        {for (k=0; t==pbp && k<inc; k++)
                            n[j]+=(arr[j+(i*inc+k)*w[3]]>T);
                        if (n[j]>=t)
                            {x[i]=w[1]+j;
                            break;
```

```
                    }
                }
            else
                /* searching from right left */
                for (t=pbp, j=s1[i]-1; j<s1[i] && t>0; --t)
                    for (j=s2[i]-1; j>=s1[i]; j--)
                        {for (k=0; t==pbp && k<inc; k++)
                            n[j]+=(arr[j+(i*inc+k)*w[3]]>T);
                         if (n[j]>=t)
                            {x[i]=w[1]+j;
                             break;
                            }
                        }
    }
    /* reverse the measurement order */
    if (reverse)
        for (i=0; i<(nos>>1); i++)
          {j=y[i]; y[i]=y[nos-i-1]; y[nos-i-1]=j;
           j=x[i]; x[i]=x[nos-i-1]; x[nos-i-1]=j;
          }
}
/****************end of LDMEDGE.C************************/

/*********************ELLIPSER.C************************/
/* ELLIPSER.C: Return the row location for a given column of
 * an ellipse of window w or -1 if the given column is out
 * of boundary.
 */
include <math.h>
short ellipser(short *w, short col)
{
  return (col>=w[1] && col<w[1]+w[3])?
            (short)(w[0]+(w[2]>>1)*(1.0+
                sqrt(1.0-pow(((double)col-
                    w[1]-(w[3]>>1))/(w[3]>>1),2.0))))
            : -1;
}
/****************end of ELLIPSER.C***********************/

/*********************ELLIPSEC.C************************/
/* ELLIPSEC.C: Return the column location for a given row of
 * an ellipse of window w or -1 if the given row location is
 * out of boundary.
 */
include <math.h>
short ellipsec(short *w, short row)
{
  return (row>=w[0] && row<w[0]+w[2])?
            (short)(w[1]+(w[3]>>1)*(1.0+
                sqrt(1.0-pow(((double)row-
                    w[0]-(w[2]>>1))/(w[2]>>1),2.0))))
            : -1;
}
/****************end of ELLIPSEC.C***********************/
```

APPENDIX D

Subroutine for autocorrelation
```
/********************AUTOCORR.C***********************/
/* AUTOCORR.C: Compute autocorrelations of neighborhoods of
 *     size nbr by nbc from a huge short array, *a, of
 *     dimension winr by winc, and save the coefficients of
 *     correlation in a double float array, *corr, of the
 *     neighborhood size (nbr by nbc).
 *   Since the correlation of corr[0] is always 1 (with
 *     itself), the variance of the window (winr by winc) is
 *     saved in corr[0] instead.
 *   The function won't check array boundaries and values
 *     passed.
 * The function the mean of the window (winr by winc) in
 * double float type.
 */ include <math.h>
include <string.h>
include <memory.h>
double autocorr(unsigned short huge *a, short winr,
                short winc, double *corr, short nbr,
                short nbc)
{register unsigned short i, j, r, c;
 double avg, var;
 /* loop for nbr*nbc correlations of neighborhood
  * for example 3*3 neighborhood
  *   r,c     r,c+1   r,c+2
  *   r+1,c   r+1,c+1 r+1,c+2
  *   r+2,c   r+2,c+1 r+2,c+2
  * Correlation of (r+i,c+j), denoted by corr[i*nbc+j],
  * is the correlation between pexil at (r,c) and pixel
  * at (r+i,c+j).
  */
 /* compute the cross products and overall sum */
 memset(corr, 0, sizeof(double)*nbr*nbc);
 for (avg=r=0; r<winr && !kbhit(); r++)
     for (c=0; c<winc; c++, a++)
         for (avg+=(*a), i=0; i<nbr && i+r<winr; i++)
             for (j=0; j<nbc && j+c<winc; j++)
                 corr[i*nbc+j]+=a[0]*a[i*winc+j];
 /* It may take a long time so the process can be
  * interrupted by a key hit at the keyboard
  */
 if (kbhit()) return 0;
 /* Calculate the common mean and variance for correlations
  * avg=ΣX/n
  * var=ΣX²/n - (ΣX/n)²
  *    =ΣX²/n - avg*avg
  * corr=(ΣXY/m - (ΣX/n)²)/((ΣX²/n - (ΣX/n)²)
  *    =(ΣXY/m - avg*avg)/var
  * m=actual points ≤ n
  * X and Y are assumed from the same population
  */
 /* compute the mean and variance of the huge array *a;
  * won't compute correlations if avg or var is zero.
  */
 if ((avg=avg/winr/winc)*100 &&
     (var=corr[0]/winr/winc-avg*avg)*100 )
     /* Compute the correlations
      * This method is an approximation so that some
      * correlations may be < -1 or > 1.
      * If so, set it equal to -1 or 1.
      */
     for (i=0; i<nbr; i++)
         for (j=0; j<nbc; j++)
```

```
            if (r=i*nbc+j,
                corr[r]=corr[r]/(var*(winr-i)*(winc-j)) -
                        avg*avg/var,
                corr[r]>1)
                corr[r]=1;
            else if (corr[r]<-1)
                corr[r]=-1;
    /* The variance of the huge array is saved in corr[0] */
    corr[0]=var;

/* The mean of the huge array is returned */
    return avg;
}
/***************end of AUTOCORR.C************************/
```

APPENDIX E

Subroutine for data smoothing

```
/*********************SMOOTHMD.C************************/
/* SMOOTHMD.C: Smooth array a by running medians of m, k
 *      times and the smoothed data are saved in array s.
 *      If m<3 or k=0 then smooth array a by running averages
 *      of m. The array two ends remains unchanged. The array
 *      a remains unchanged only if k<2 or m<2.
 * The function returns the smoothed array s if done
 *      or a if parameter passed invalid.
 */
#include <memory.h>
#include <string.h>
short *smoothmd(short *a, short *s, short n,
                short m, short k)
{register short i, j;
 short index[128], *pa, t, g, h, f, v;
 if (m<2 || m>128) return a;
 memcpy(s,a,n*sizeof(a[0]));
 /* smooth by averaging
  * if k is zero or the size of neighborhoods is < 3
  */
 if (!k || m<3)
    {for (h=m>>1, j=i=0; i<m-1; i++)
         j+=a[i];
     for (; i<n; i++, j-=a[i-m])
         {j+=a[i];
          s[i-h]=j/m;
         }
    }
 else
 /* smooth by running medians of m k times */
 while (k)
        {for (h=m>>1; h<n-(m>>1); h++)
            {/*INDEXSORT: SHELLSORT sort a[] into ascending
              *            order and index is saved in index
              *            and a[] remain unchanged.
              */
             for (i=0; i<m; i++)
                 index[i]=i;
             pa=&a[h-(m>>1)];
             for (g=m>>1; g>0; g>>=1)
                 for (j=g; j<m; j++)
                     if (pa[index[i=j-g]] <
                         (t=pa[v=index[j]]))
                         {do
                             index[i+g]=index[i];
                          while ((i-=g)>=0 &&
                                 pa[index[i]]<t);
                          index[i+g]=v;
                         }
             s[h]=pa[index[m>>1]];
```

```
            }
            memcpy(a,s,n*sizeof(a[0]));
            --k;
        }
    return s;
}
/****************end of SMOOTHMD.C************************/
```

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

What is claimed is:

1. A method of automatically recognizing muscle interfaces of an animal or carcass from an ultrasonic image of a muscle area, comprising the following steps:
   a) providing an input of an ultrasonic scan image of said muscle and fat area of said animal or carcass comprising rows and columns of pixel data;
   b) selecting a window of rows and columns of pixels within said image input;
   c) scanning upward through said window, starting at a point in the bottom row of pixels within said window, until an interface is determined by the following steps:
      i) defining a sliding lower box of pixels and an adjacent sliding upper box of pixels wherein said sliding boxes are redefined to move up through said window one row at a time at least until said interface is determined,
      ii) computing the expected value and the standard deviation of the difference between the means of the gray levels of the pixels within said sliding lower box and said sliding upper box,
      iii) computing a number of normal deviates value for each row of pixels moving upwards through said window, wherein said number of normal deviates value is computed from the values determined in step ii by dividing the absolute value of the difference of the means of the gray levels of the pixels within said sliding lower box and said upper box less said computed expected value, by said computed standard deviation, and
      iv) defining said interface at a specified row of pixels when said number of normal deviates value for said specified row of pixels is greater than both a predefined interface threshold and is greater than said number of normal deviates value calculated for the row of pixels one row lower and one row higher than said specified row of pixels; and
   d) providing an output of said determined interface.

2. The method of claim 1 further comprising determining a second interface by scanning upward through said window beginning as a point above said determined first interface the steps i)-iv) of step c and providing an output of said determined second interface and a distance between said first and second interfaces.

3. The method of claim 2 wherein an ultrasonic transducer is centered over the last few ribs of said animal or carcass and said ultrasonic image is of a ribline, a longissimus dorsi muscle and fat layers above said muscle such that said specified window starts below said ribline of said animal or carcass, wherein said method further comprises:
   e) determining a fat depth from a distance between said second interface line and a specified plane of contact between said animal or carcass and said ultrasonic transducer adjusted for any positioning equipment or stand-off gel;
   f) determining a muscle depth from a distance between said first and second interfaces line; and
   g) providing an output of said fat depth and said muscle depth for said animal or carcass from which said image was taken.

4. The method of claim 3 wherein said ultrasonic scan image input is longitudinal with respect to a backbone of said animal or carcass.

5. The method of claim 3 wherein said ultrasonic scan image input is transverse with respect to a backbone of said animal or carcass.

6. The method of claim 1 wherein the expected value of the difference between the means of the gray levels of the pixels within said sliding lower box and said sliding upper box is assumed to equal 0 and the standard deviation of the means of the gray levels of the pixels within said sliding lower box and said sliding upper box are assumed to be equal.

7. A method of determining marbling scores of a muscle of an animal or carcass from an ultrasonic image of said muscle, comprising the following steps:
   a) providing an input of an ultrasonic scan image of said muscle and fat area of said animal or carcass comprising rows and columns of pixel data;
   b) selecting a window of rows and columns of pixels within said image input;
   c) calculating correlations between gray values of neighboring pixels within said window;
   d) providing a marbling score regression equation which includes said marbling score as a dependant variable and said correlations between neighboring pixels as an independent variable; and
   e) solving said marbling score regression equation and providing an output of said marbling score corresponding to said image input.

8. The method of claim 7 further comprising the following steps between steps c) and d):
   a) calculating a variance of gray values of pixels within said window;
   b) calculating a adjusted variance of gray values of pixels within said window adjusted for said correlations between gray values of neighboring pixels;
   c) superimposing normal distribution curves of said variances by offsetting the mean of each distribution such that said curves corresponding to each of said variances are superimposed upon one another;
   d) measuring non-overlapped areas under said overlapping normal distribution curves; and
   e) providing a marbling score regression equation which further includes said measurement of said non-overlapped areas under said overlapping normal distribution curves as an independent variable.

9. The method of claim 7 wherein said ultrasonic scan image input includes a longissimus dorsi muscle of said animal or carcass and is longitudinal with respect to a backbone of said animal or carcass centering over the last few ribs of said animal or carcass.

10. The method of claim 7 wherein said ultrasonic scan image input includes a longissimus dorsi muscle of said animal or carcass and is transverse with respect to a backbone of said animal or carcass centering over the last few ribs of said animal or carcass.

11. A method for detecting an outline of a muscle from an ultrasonic image of an animal or carcass, comprising the following steps:
  a) providing an input of an ultrasonic scan image including said outline of said muscle of said animal or carcass comprising rows and columns of gray level pixel data;
  b) creating an averaged image by replacing said gray level data for each of said pixels with an average of neighboring pixel gray levels;
  c) creating a shift and difference image by:
    i) creating a shifted image by shifting said averaged image vertically and horizontally,
    ii) creating a first resultant image by subtracting said shifted image from said averaged image,
    iii) creating a second resultant image by subtracting said averaged image from said shifted image,
    iv) combining said first and second resultant images to create said shift and difference image;
  d) creating a bilevel image by selecting a threshold for converting each gray level value of each pixel to one of two levels and using said threshold to convert said gray level values to bilevel values,
  e) selecting an initial window of rows and columns of pixels within said bilevel image;
  f) defining subwindows within said initial window such that each of said subwindows includes a portion of said outline;
  g) detecting said outline within each of said subwindows by searching said subwindow for rows or columns containing a higher ratio of bilevel pixels than a selected threshold ratio specific to each subwindow or higher;
  h) combining said outline detections in each of said subwindows to provide a representation of said muscle outline; and
  i) providing an output of said representation of said muscle outline corresponding to said image input.

12. The method of claim 11 further comprising calculating an area within said outline representation and providing an output of said calculated area.

13. The method of claim 11 wherein said threshold for converting gray level values to bilevel values is selected at such a level that maximizes the correlation coefficient between said shift and difference image and said bilevel image.

14. Automatic muscle interface analyzing equipment for analyzing an ultrasonic image of muscle and fat of an animal or carcass, comprising:
  a) an image grabber board for digitizing an input of an ultrasonic scan image of a muscle and fat of said animal or carcass comprising gray level pixel data;
  b) control means for:
    1) selecting a window of rows and columns of pixels within said image input;
    2) scanning upward through said window, starting at a point in the bottom row of pixels within said window, until an interface is determined by the following steps:
      i) defining a sliding lower box of pixels and an adjacent sliding upper box of pixels wherein said sliding boxes are redefined to move up through said window one row at a time at least until said interface is determined,
      ii) computing the expected value and the standard deviation of the difference between the means of the gray levels of the pixels within said sliding lower box and said sliding upper box,
      iii) computing a number of normal deviates value for each row of pixels moving upwards through said window, wherein said number of normal deviates value is computed from the values determined in step ii by dividing the absolute value of the difference of the means of the gray levels of the pixels within said sliding lower box and said upper box less said computed expected value, by said computed standard deviation, and
      iv) defining said interface at a specified row of pixels when said number of normal deviates value for said specified row of pixels is greater than both a predefined interface threshold and is greater than said number of normal deviates value calculated for the row of pixels one row lower and one row higher than said specified row of pixels; and
  c) means for providing an output of said determined interface.

15. Automatic marbling score analyzing equipment for analyzing an ultrasonic image of muscle of an animal or carcass, comprising:
  a) an image grabber board for digitizing an input of an ultrasonic scan image of a muscle of said animal or carcass comprising gray level pixel data;
  b) control means for:
    1) selecting a window of rows and columns of pixels within said image input,
    2) calculating correlations between gray values of neighboring pixels within said window,
    3) providing a marbling score regression equation which includes said marbling score as a dependant variable and said correlations between neighboring pixels as an independent variable, and
    4) solving said marbling score regression equation; and
  c) means for providing an output of said marbling score corresponding to said image input.

16. The apparatus of claim 15 further comprising control means for:
  5) calculating a variance of gray values of pixels within said window,
  6) calculating a adjusted variance of gray values of pixels within said window adjusted for said correlations between gray values of neighboring pixels,
  7) superimposing normal distribution curves of said variances by offsetting the mean of each distribution such that said curves corresponding to each of said variances are superimposed upon one another,
  d) measuring non-overlapped areas under said overlapping normal distribution curves, and
  e) providing a marbling score regression equation which further includes said measurement of said non-overlapped areas under said overlapping normal distribution curves as an independent variable.

17. Automatic muscle outline analyzing equipment for analyzing an ultrasonic scan image of a muscle of said animal or carcass, comprising:
   a) an image grabber board for digitizing an input of an ultrasonic scan image of a muscle of said animal or carcass comprising gray level pixel data;
   b) control means for:
      1) creating an averaged image by replacing said gray level data for each of said pixels with an average of neighboring pixel gray levels,
      2) creating a shift and difference image by: i) creating a shifted image by shifting said averaged image vertically and horizontally, ii) creating a first resultant image by subtracting said shifted image from said averaged image, iii) creating a second resultant image by subtracting said averaged image from said shifted image, and iv) combining said first and second resultant images to create said shift and difference image,
      3) creating a bilevel image by selecting a threshold for converting each gray level value of each pixel to one of two levels and using said threshold to convert said gray level values to bilevel values,
      4) selecting an initial window of rows and columns of pixels within said bilevel image,
      5) defining subwindows within said initial window such that each of said subwindows includes a portion of said outline,
      6) detecting said outline within each of said subwindows by searching said subwindow for rows or columns containing a higher ratio of bilevel pixels than a selected threshold ratio specific to each subwindow or higher,
      7) combining said outline detections in each of said subwindows to provide a representation of said muscle outline; and
   c) means for providing an output of said representation of said muscle outline corresponding to said image input.

* * * * *